United States Patent [19]

Zodrow

[11] Patent Number: 5,004,518

[45] Date of Patent: Apr. 2, 1991

[54] LABELLING MACHINE FOR OBJECTS SUCH AS BOTTLES OR THE LIKE

[75] Inventor: Rudolf Zodrow, Düsseldorf, Fed. Rep. of Germany

[73] Assignee: ETI-TEC Maschinenbau GmbH, Erkrath, Fed. Rep. of Germany

[21] Appl. No.: 335,478

[22] Filed: Apr. 7, 1989

[30] Foreign Application Priority Data

Apr. 9, 1988 [DE] Fed. Rep. of Germany ....... 3811869
Mar. 15, 1989 [DE] Fed. Rep. of Germany ....... 3908378

[51] Int. Cl.$^5$ .............................................. B65C 3/16
[52] U.S. Cl. ................................... 156/568; 156/571; 156/578; 118/230; 271/33
[58] Field of Search .................. 156/568, 571, 578; 118/230, 231; 271/33

[56] References Cited

U.S. PATENT DOCUMENTS

| | | | |
|---|---|---|---|
| 4,077,621 | 3/1978 | Knuppertz et al. | 156/568 X |
| 4,298,422 | 11/1981 | Zodrow | 156/571 X |
| 4,508,330 | 4/1985 | Jorss | 156/568 X |
| 4,531,995 | 6/1985 | Gau | 156/456 |

Primary Examiner—David A. Simmons
Assistant Examiner—James J. Engel, Jr.
Attorney, Agent, or Firm—Nils H. Ljungman & Associates

[57] ABSTRACT

This invention relates to a labelling machine for objects, in particular bottles, with several stations located one behind another along a track, namely an adhesive application station, a label feed station and a label transfer station. At least one extracting element is mounted so that it can rotate on a rotating support. The extracting element has an outwardly curved receptacle surface for the label which rolls past the individual stations when the support rotates. The drive mechanisms of each extracting element comprises a cam transmission mechanism. The cam transmission mechanism comprises two cams located one above the other. The cams have the basic shape of ovals indented on both long sides and are oriented crossways to one another. A plurality of followers engage with the outside curves of the cams. The followers are offset from one another by an angle not equal to 90 degrees and have lever arms of different lengths.

11 Claims, 31 Drawing Sheets

LABELLING MACHINE FOR OBJECTS SUCH AS BOTTLES OR THE LIKE

BACKGROUND OF THE INVENTION

1. Field of the Invention

This invention relates to a labelling machine for objects, in particular bottles, with several operating stations located behind one another along a track. The operating stations include an adhesive application apparatus, a label supply box and a label transfer cylinder. The machine includes at least one extracting element for the labels which is mounted so that it can rotate on a rotating support and move past the stations during each rotation of the support. The extracting element has an outwardly-curved receptacle surface for the label which rolls along the stations. The drive for each extracting element is a cam drive, which comprises common, stationary double cam discs for all the extracting elements. The cams are located on one side in two planes with one above and at some distance from the other. Two sets of followers are mounted on an extracting element drive shaft or on a bearing shaft coupled with it by means of a support element. The followers cooperate with the two cams to produce positive movement of each extracting element over its entire revolution when the support rotates.

The invention also relates to a support element for the followers of a cam drive mechanism and, more particularly, to a drive mechanism for a label extracting element in a labelling machine.

Still further, the invention relates to a labelling station of a labelling machine for containers, such as bottles, with a support table which can be driven by a central drive shaft. The table support has at least one extracting element which has a curved receptacle and is mounted so that it can rotate in the machine frame. When the table rotates, the extracting element rotates or pivots around its own axis and is moved along a closed track past stations for the application of adhesive to the receptacle surface and for the storage or transfer of the labels. Each extracting element is rotated or pivoted by a cam transmission which, in turn, is moved by a cam disc which is mounted on the machine frame and which is common for all of the extracting elements.

2. Description of the Prior Art

The prior art includes various cam-controlled drive mechanisms to turn the extracting elements in labelling machines at the various stations in the same direction over their entire orbit. The extracting elements may turn at different angular velocities at different locations during the turning thereof.

In one drive system of the prior art as disclosed in German Patent No. 24 36 003 P2, the extracting elements are always driven by a pair of lever arms, which are guided with a follower in a closed grooved cam. The partly-overlapping grooved cams are in different planes for a clear guidance of the lever arms. Because of the guidance of each follower on two flanks of the corresponding grooved cam, each follower is clearly guided. The grooved cams are configured so that the one follower is under torque when the other follower is in an idle position. It does not appear that such a drive mechanism, however, has been realized in actual practice.

Nor, it seems, has it been possible to realize in actual practice another drive mechanism for a labelling machine of the type described in German Patent Publication Published for Opposition Purposes No. 27 09 521 A1. In this latter drive mechanism, there are two cam discs with cams having outside surfaces which are located in two planes, one above the other. For each cam, there is a set of two followers. The two pairs of followers are offset on the upper and lower side of a disc by 90 degrees in relation to one another. The disc is supported by a bearing shaft which extends to the plane between the cam discs. It cannot be determined from the teaching of this prior art device whether precautions have been taken to ensure a collision-free passage of the bearing shaft in the outside radial areas of the cam disc adjacent to the bearing shaft. Still further, the two pairs of followers are located at the same radial distance (same lever arm length) from the bearing shaft of the support element. It also cannot be determined whether particular precautions have been taken for a compact design of the drive mechanism in which there is the most favorable possible distribution of the load on the drive system at the various stations.

A labelling machine of the general type described above has been disclosed in U.S. Pat. No. 4,298,422 and includes another drive mechanism, however, which appears to have been used in actual practice. In this labelling machine, the cam drive mechanism is designed as a lantern gear transmission including two sets of lantern gear teeth which are located on the inside of the double cam disc designed as a ring-shaped body. A support element supports one set of the followers designed as lantern wheels on its two sides and is located between the two lantern gears on the end of the downwardly extending drive shaft of the extracting element. So that a collision-free passage of the drive shaft along the lantern gear on the shaft side is possible, the points of the teeth of the lantern gear are cut off.

With such a drive mechanism, of course, a nonuniform rotation of the extracting elements can be achieved, but the cost and complexity of the lantern gear transmission would be significant. A further disadvantage includes the radial diameter of the lantern gears not being very compact because of the minimum width of the individual teeth.

Existing labelling machines comprise a series of interconnected parts which employ a thin insert of elastic material at the junction of the parts to reduce mechanical noise. Such machines include a labelling station in which an extracting element is employed to apply adhesive to the labels and transfer the labels to containers. The extracting element is driven by means of a lantern gear transmission which includes an annular body having two internal lantern gears and two lantern wheels engaged with the lantern gears which are located on the opposite side of a support and act as followers to damp noise and compensate for part tolerance. See, for example, U.S. Pat. No. 4,298,422 which is incorporated herein by reference as if the entire contents thereof was fully set forth herein.

Each follower is equipped with an insert designed to allow for the damping of noise and compensation of tolerances. The insert is in the form of a bushing interposed between the inner bearing and the outer running surface of a roller, with which each lantern wheel is equipped. The employment of such an insert in a cam drive mechanism is not practical, because of the high load exerted on the rollers, which are mounted on the followers, due to the small surface area of the insert.

This is especially true if only a few rollers, for example, two, are employed.

Since the insert is constructed as thin as possible to achieve a precise guidance, large loads can reduce or entirely eliminate the damping action, because the bearing and the running surface come in direct contact with one another. Moreover, any eccentricity which occurs due to load will reduce the desired precise rotational movement of the extracting element.

It is not uncommon for prior art labelling stations, in which the extracting elements are located above a support table and are mounted on a shaft in bearings in the support table, to employ a hollow central shaft through which a central drive shaft runs and on which the table is mounted. The hollow drive shaft and a tension element running through it extend through an opening located in the base plate of the machine frame to below the base plate, where the coupling between the drive and the drive shaft is located. By activating the tension element, the coupling can be axially retracted, so that the drive shaft can be uncoupled from the drive. When uncoupled, the support table can then be realigned by rotating it. Such a realignment is used during format changes of containers or labels to center the labels on the containers. See, for example, German Patent No. 2,435,540 B2, the contents of which are herein incorporated by reference as if set forth fully herein.

Such labelling stations have the disadvantage that a great deal of space is required for the mounting of the table on the hollow shaft of the machine frame. An additional disadvantage is that access to the coupling is located underneath the base plate of the machine frame and is extremely difficult to reach. When adjusting the degree of rotation during realignment it is useful to be able to check the degree of rotation if the service personnel can get to the coupling without a great deal of effort.

OBJECTS OF THE INVENTION

It is an object of the invention to provide a labelling machine of the type generally described above, in which the extracting elements are generally turned in the same direction throughout their orbits by the various operating stations.

It is another object to provide such a labelling machine which includes a simpler drive mechanism.

It is a further object to provide such a labelling machine including features which also make possible a compact structure.

It is an object in a more detailed form of this invention to provide a labelling machine of the type generally described above with a simple and compact drive mechanism, in which the favorable loading of the drive mechanism is possible, taking into consideration the different angular velocities at the individual stations.

It is also an object of the invention to provide a support element for a cam follower with improved damping action and precision of guidance.

It is yet another object of the invention to provide a labelling station which has a compact construction and on which it is possible to rotate and realign the support table without a great deal of effort.

SUMMARY OF THE INVENTION

These and other objects of the invention are provided by a preferred labelling machine of the type described above, in which the drive or bearing shaft ends prior to reaching the plane in which the first, upper cam lies.

The followers, which correspond to the other, second cam, are mounted on a bridge element disposed between the two cams. The bridge element is supported by spacer elements mounted on the support element, which lie outside the area being covered by the motion of the first cam. It is particularly advantageous if the followers, which are already present, also comprise the spacer elements.

The preferred labelling station in accordance with the invention can be executed in a compact structure and with a simple configuration of the cams, because both cams with their actuators can extend into the area of the drive or bearing shaft of the followers. To be able to execute a full revolution, there is no longer any need to have a lantern gear with a plurality of teeth. Instead, a comparatively simple pair of cam discs and corresponding sets of followers will suffice. For example, it is sufficient for each set to include two followers which are located opposite one another in relation to the axis of the drive or bearing shaft. The followers of the other set are rotationally offset by 90 degrees. The cam discs required in this case for the rotation of the extraction element during its movement along the three stations have a continuous contour which is approximately in the shape of an ellipse indented in the center region of both sides. Such a contour is significantly less complicated than that of a lantern gear.

The free space for the first cam extending into the vicinity of the axis of the drive or bearing shaft is realized in one embodiment of the invention which includes the use of a bridge element. The followers are pivotally supported. The bridge element is supported on its one side by the pivotal supports for the followers corresponding to the first cam and, on its other side, supports the pivotal supports for the followers corresponding to the second cam. Preferably, the followers are rollers which are mounted on pivots so that they can rotate.

To damp noises on the one hand and to compensate for tolerances on the other hand, for labelling machines of the type described above, the prior art device discussed above includes an insert made of elastic damping material in the rollers of the lantern wheels. Such a damping is not optimal for the cam drive mechanism in accordance with the present invention because the load of the follower rollers mounted on pivots would be too great because of the small surface area of the elastic insert. While in the prior art, at least two rollers are simultaneously engaged, in the present invention, if there are only four followers, there are phases in which only one follower of each set is engaged with a cam. The load on the one follower is correspondingly large. Because of the very thin insert, necessary for reasons of precise guidance, such a high load could mean that the damping action is entirely lost. In addition, with the damping exerted individually on each follower, an eccentricity of the individual follower which could occur under load would have a negative effect on the desired precise rotational movement of the extraction element.

To eliminate these disadvantages on one hand and to still provide a damping on the other hand, in an additional configuration of the invention, the primary support element of the two sets of followers consists of an outer body supporting the followers and an inner body connected to it by means of an insert made of elastic damping material. The two bodies are positively connected to one another in the vicinity of the insert by means of radially oriented claws or fingers. In this embodiment of the invention, the geometric orientation of the followers in relation to one another is rigid. As a result, they can only be displaced eccentrically on the shaft together, as a unit.

For a precise rotational movement, this type of displacement is less detrimental than would be the individual displacements of the followers, since the engagement relationships between the followers and the cams remain essentially constant and unchanged.

Instead of decoupling the followers from each other, it is also possible for the support element supporting the followers to consist of an outside body supporting a drive pinion for the drive shaft and an inner body which is connected with the outside body by means of an insert made of elastic damping material. The two bodies are engaged with one another in a positive manner in the vicinity of the insert by means of radially-oriented claws or fingers.

In accordance with an additional embodiment of the invention, the double cam disc having outside cam surfaces is located inside the orbit of the followers and is rigidly connected by means of a support bridge located in the machine frame below the followers.

The special design of the cam drive mechanism makes possible a geometry which results not only in a compact construction, but also in an optimal distribution of the load on the cams. In this sense, and in accordance with one embodiment of the invention, two extreme points of the two cams guiding the followers lie in the sector between the gripper cylinder and the adhesive application roller. Each of another extreme point lies in the sector between the gripper cylinder and the label box and between the label box and the adhesive application roller. Preferably, at least one of the extreme points lies outside the midpoint track of the support element of the followers.

In accordance with another geometric embodiment of the invention, when there is a transmission mechanism in the form of the cam located between the drive shaft of the extraction element and the support element, when the axis of the drive shaft of the extracting element is outside the path of the midpoint of the support element, and when the center position of the extractor element is aligned with and in front of the label box, one pair of followers has both followers engaged with the cam. In this embodiment, both followers of the follower pair already have a load-bearing function, even though one of the two followers is about to lose its load-bearing function.

It is an additional advantage for the compact construction if the ratio of the radius of the track of the midpoint of the support element to the radius of the orbit of the followers on the support element is approximately 3 to 1.

Finally, it also turns out to be advantageous if the non-loadbearing cam tracks described by the followers lie, for the most part, inside the track of the midpoint of the drive shaft of the extracting element.

The requirements for a compact structure, smooth operation and long service life, taking into consideration the deceleration and acceleration of the extracting elements imparted by the outside surfaces of the cams, can be optimized by additional geometric relationships of the cam drive mechanism and the position of the individual components.

For this purpose, the extreme points on one of the two cams respectively lie on a ray or line which emanates from the support midpoint. The two rays or lines enclose an obtuse angle. Teeth or junctions formed in the overlapping areas of the two outside cams, with which the followers of both sets interact simultaneously, include a pair of narrower teeth which lie within the obtuse angle.

Preferably this obtuse angle is between about 120 degrees and about 160 degrees and, in particular, could be about 140 degrees. Moreover, the extreme points of the other cam preferably lie at least approximately on a straight line which runs generally through or near the mid-point of the support.

With a labelling machine designed as described above, it is guaranteed that, in addition to a compact structure for the extraction elements, it has an optimal drive mechanism, because the followers are optimally guided by the outside cams over the entire circumference in order to produce the required rotational movement. The outside surfaces of the cams are configured so that they are distributed as optimally as possible for the forces required for acceleration which is needed for the rotational movements required at the individual stations. Thus it is possible in the context of the invention to configure each cam so that the angular velocity of each extraction element reaches a maximum only in the roll-off area of the stations and a minimum only in the intermediate areas between them. The maxima and minima should preferably lie in the middle of a roll-off area or an intermediate area. The minimum angular velocity in the intermediate areas should be less than one-half the maximum angular velocity in the roll-off areas. If the angular velocity is at a maximum in the vicinity of the gripper cylinder, a motion can be achieved which favors the loosening of the label from the adhesive surface of the extraction element.

Preferably, the outside surfaces of the cams are designed so that in the intermediate areas, the rotational movement which begins in the roll-off areas is continued, but with a different angular velocity. As a result, the extraction element arrives at the next station in the correct angular position without the need for extreme accelerations or decelerations in this intermediate area. As a result it is possible to reduce the velocity to 0 or even beyond 0 to produce a reverse rotation.

In accordance with an additional embodiment of the invention, the distance between the contact points of the followers on the flanks of one of the narrow teeth or junction formed by the overlapping regions of the two cams is about 30% to about 40% less than the corresponding distance for one of the wide teeth or junctions. In such a situation, the connecting line running through the mid-point of the followers in contact with the tooth or junction is perpendicular to the radial ray or line emanating from the midpoint of the support and running through the point of the tooth or junction.

Additional characteristics to optimize the geometry can include the fact that the extreme points of the outside surfaces of the two cams generally lie on a circle around the center of the support. Still further, the points of the teeth or junctions formed by the overlapping areas of the cams lie inside the circle for the extreme points and are located at different radial distances from the mid-point of the circle or the support. The radial distances between the mid-point and the points of the narrow teeth are approximately equal to each other while the radial distances between the mid-point and the points of the wide teeth are approximately equal to each other. However, the radial distance between the mid-point and each of the points of the narrow teeth is greater than the distance between the mid-point and each of the points of the wide teeth.

The objects of the more detailed form of the invention are provided in a preferred labelling machine in which the axes of all the followers lie inside a moving equivalent cam surface of the cam drive mechanism and at least one follower, and preferably all the followers include portions which lie partly outside a moving equivalent cam surface. With regard to the compact structure of the drive under load, it is particularly favorable if some of the followers are offset from one another by an angle which is not equal to 90 degrees and have lever arms of different lengths. With this configuration, it is advantageous for a favorable distribution of the load on the individual followers, taking into consideration the different lengths of their lever arms if two followers with large lever arms or if two followers with small lever arms and one followers with a large lever arm are engaged with the cams.

Taking into account the different requirements set for the individual stations, the geometric relationships of the followers should be selected in particular so that the following engagement alternatives are available:

(a) With the adhesive application roller, two followers with small lever arms are engaged for transmitting torque and one follower with a large lever arm is supporting from the other side.

(b) With the label box, one follower with a large lever arm is engaged for transmitting torque and one follower with a large lever arm is supporting from the other side.

(c) With the label transmission cylinder, one follower with a large lever arm is engaged for transmitting torque and two followers with small lever arms are supporting from the other side.

The configurations guarantee that with a compact design of the labelling machine, the extracting element is not only precisely guided at each point, but above all, the load is distributed as favorably as possible over all the elements being driven. If there is only one follower transmitting torque, it is preferably one with a large lever arm. If there are two followers transmitting torque, they are preferably followers with the small lever arms. It is of particular advantage, therefore, for the two followers with small lever arms to transmit torque to the adhesive application roller, where, because of the required high acceleration in the rotation of the extracting element, the greatest torque must be applied.

With regard to a minimization of the forces involved, it is also advantageous if the follower with a large lever arm transmitting torque to the label box corresponds to the cam lying closer to the drive or bearing shaft.

In accordance with another configuration, each set of followers should include one follower with a long lever arm and an opposite follower with a short lever arm.

Other geometric features of the invention include the fact that the radius of the orbit of the bearing shaft is less than the radius of the orbit of the drive shaft of the extracting element, and that the axes of the followers or drive elements lie within the moving equivalent cam surface of the cam drive mechanism.

The compact design achieved by means of the invention can be realized with a transmission translation ratio between the drive shaft and the bearing shaft together with a sturdy construction of the drive mechanism in one embodiment, in which at least one of the outer periphery of the followers with a long lever arm is tangent to or projects beyond the arc of the gear wheel located on the bearing shaft. If the followers include rollers mounted on bearing pins, as in the prior art, the bearing pins located closest to the bearing shaft should be integrally connected to the support element, which supports the gear wheel on a radially recessed projection. The result in this configuration, even for the followers with a large lever arm, is a sturdy connection with the support element.

One object is accomplished in accordance with the invention in that the support element includes an outer body and an inner body located within, but not directly touching the outer body. The outer body has claws which project radially inwardly and the inner body has claws which project radially outwardly and lie between the inwardly-directed claws of the outer body. The space between the inner and outer bodies is filled with an insert made of elastic material. One or more cam followers are positioned on the claws of the outer body.

The support element is able to transmit high torques without precise guidance being adversely affected since the claws of the inner and outer bodies are form fitted. The claws of the outer body provide large radial support surfaces. The large support surfaces allow the insert to be constructed relatively thin without the loss of the damping action due to overloading. Since the support element, itself, employs a damping insert made of elastic material, the individual followers no longer need to have such an insert. This provides the advantage that all of the followers may be rigidly mounted on the outer body. Consequently, the followers can be moved only as a unit, eccentrically on a shaft, which aids in the precise guidance of the support element during the rotational movement.

In one embodiment of the invention, the spaces adjacent the claws of the outer body are closed by an end wall and the elastic insert is positioned between this end wall and the end surfaces of the claws of the inner body. The result is not only a good support in the axial direction, but also an improvement of the angular rigidity.

To improve the level of precision of guidance in the radial direction, annular surfaces may be provided to extend between the two bodies and the elastic insert may be positioned between those surfaces. Preferably, two annular surfaces may be formed by sleeve-shaped projections which are relatively coaxially positioned. Preferably, the annular surfaces make the transition gradually into the surfaces of the outer body and the spaces lying between the claws of the inner body. As a result of this embodiment, there is continuous support in the vicinity of the followers which extends over the entire axial length of the outer and inner bodies and the sleeve-shaped projections, including the elastic insert.

There may be several radial recesses in the inner and outer bodies which are filled with slugs of elastic material connected with the elastic insert to improve axial security. Preferably, the recesses are located on the outside circumference of the support elements. It is also advantageous if the recesses are aligned with one another in pairs, The support element can transmit torque to the extracting element in various ways. It is possible, for example, to transmit the torque from the support element directly to the drive shaft of the extracting element on which the support element is positioned. However, it is also possible to have the support element positioned on a bearing shaft, and to transmit the torque by means of a transmission attached to the shaft of the extracting element. In this case, the outer body can support a drive pinion. In this embodiment, therefore, the drive pinion is also decoupled from the bearing shaft mounted in the machine frame.

The support element is suitable not only for followers engaged with it by means of a short lever arm, but also for followers which are engaged with it by means of a long lever arm, due to the precise guidance and good damping action provided. Therefore, it is possible to, optionally, equip the support element with followers located in one or two planes.

In another embodiment, the invention is suitable for use in a labelling station for objects such as bottles. Several stations may be positioned serially along a track. Such stations may include adhesive application apparatus and label transfer apparatus. At least one extracting element for the labels would be mounted so that it can rotate on a rotating support and be moved past the stations during each rotation of the support. The extracting element, preferably, has an outwardly-curved receptacle surface which rolls over the top label in the label feed station and over the other stations. The drive for each extracting element is, preferably, a cam drive, which comprises common, stationary double cams for all the extracting elements and one or more interacting followers. The followers are mounted, preferably on a bearing shaft through the employment of a support element although they might also be positioned on other members such as the drive shaft. This provides the rotational movement of each extracting element when the support rotates.

In such a labelling machine, the drive shaft ends in front of the plane of the followers and the support element is equipped with a single follower which is engaged in a double cam such as a groove. Alternatively, it can be equipped with two followers which are approximately diametrically opposite one another in relation to the axis of the drive shaft. A support bridge element, preferably, is located between the first cam and a second cam and supports followers which interact with the second cam. The followers of the second cam are offset by approximately 90 degrees from the followers of the first cam.

Such labelling stations, which in one embodiment employ a grooved cam for a pivoting motion of the extracting elements and in another embodiment employs two one-sided cams for rotation of the extracting element, guarantee a precise guidance since, even with long lever arms, high torques can be absorbed on account of the thin elastic insert and large support surface, without having the outer body exert any undesirable high pressure against the inner body.

Also provided is a support element for a cam follower which includes an outer body member having a plurality of radially inwardly projecting claws for the mounting of a cam follower thereon, an inner body member for being operatively associated with the outer body member with the inner body member having a plurality of radially inwardly projecting claws for the mounting of a cam follower thereon, an inner body member for being operatively associated with outer body member with the inner body member having a plurality of radially outwardly projecting claws corresponding to the radially inwardly projecting claws of the outer body member with the inner body member and the outer body member being out of direct contact with one another. Dampening apparatus is provided for being interposed between and being in direct contact with the outer body member and the inner body member, whereby noise applied to the outer body member will be dampened before reaching the inner body member.

Further provided is a machine for applying a label to an object which includes a camming surface defining a closed path with three sequentially arranged locations positioned adjacent the perimeter of the path, adhesive supply apparatus positioned at a first of the sequentially arranged locations for supplying adhesive for the label, a label supply apparatus positioned at a second of the sequentially arranged locations for supplying the label, applicator apparatus positioned at a third of the sequentially arranged locations for receiving the label and applying it to the object and extracting apparatus adapted to move about the closed path for sequentially receiving adhesive from the adhesive supply means, simultaneously applying the adhesive to the label and removing the label from the label supply apparatus, and supplying the label to the applicator apparatus. Support apparatus is provided having at least one mechanically attached cam follower which is adapted to follow the camming surface about the closed path and which is attached to the extracting apparatus for moving the extracting apparatus about the closed path. Drive apparatus is connected to the support apparatus for moving the extracting apparatus about the path. The support apparatus includes an outer body member having a plurality of radially inwardly projecting claws for the mounting of the cam follower thereon, an inner body member connected to the drive apparatus for being operatively associated with the outer body member with the inner body member having a plurality of radially outwardly projecting claws corresponding to the radially inwardly projecting claws of the outer body member with the inner body member and the outer body member being out of direct contact with one another. Dampening apparatus is provided for being interposed between and in direct contact with the outer body member and the inner body member.

Further provided is a support element for a cam follower which includes a first member for the mounting of a cam follower thereon and a second member for being operatively and out of direct contact with the first member. Dampening apparatus is positioned between and in direct contact with the first member and the second member, whereby noise applied to the first member from the cam follower will be dampened before reaching the second member.

Another object is accomplished in accordance with the invention by means of a labelling station, similar to the type described above, in which the mounting of the support in the machine frame is located exclusively on the outer edge of the support table.

With this design, a central hollow shaft for the machine frame is no longer necessary, because the mounting is exclusively on the outer edge of the support table. This allows the entire radial space up to the central drive shaft to be used for the installation of the transmission and, particularly, for the transmission parts which are engaged. This results in a compactly designed labelling station. The mounting, which is exclusively on the outside of the table, results in a very rigid mounting in contrast to the recommendations of the prior art whereby, in addition to a central mounting, there were also external auxiliary bearings in the form of supports. Play, which occurs with the external mounting, has a less pronounced effect than corresponding play in those machines which provide support by the central axis. Finally, the present invention provides a labelling station with drives which can be completely installed when the cover plate and housing are removed. That represents an increase in serviceability.

The advantage of eliminating the central bearing axis and the hollow shaft of the support also creates free space for the installation of the coupling immediately underneath the cover plate. In one embodiment of the invention, the coupling is positioned around the drive shaft and the support is inside a central space, described by the orbit of the transmission between the cover plate and the parts of the transmission.

In another embodiment of the invention, a bumper extends through a hollow drive shaft and is connected to the drive shaft so that it can be displaced axially but not rotationally.

A spring-loaded axially retractable coupling half is fastened to the bumper, with one end which projects out of the support table and which, together with the adjacent portion of the support table, has alignment marks.

In this embodiment of the invention and in contrast to the prior art, the coupling which remains in connection with the drive is raised up above the support table. A second coupling half is connected to the table and engage the first coupling half. The degree of misalignment of the support table in relation to the drive, thereby, can be read. The spring loading of the coupling guarantees that, after adjustment, the two coupling halves engage automatically.

It is advantageous for alignment if, in accordance with another embodiment of the invention, the coupling halves are engaged with one another by means of spur gear teeth, the spacing of which coincides with the spacing of the alignment marks on the upper cover plate.

Also provided is a mounting for the support table of the labelling machine which includes a frame, a support table which is rotatably attached to the frame, a drive shaft coupled to the support table and a label extractor movably positioned adjacent the support table which includes support table mounting apparatus attached to the frame and positioned adjacent to and in movable contact exclusively with the perimeter of the support table for supporting the support table and allowing relative rotational movement of the support table with respect to the frame.

BRIEF DESCRIPTION OF THE DRAWINGS

The invention is described in greater detail below with reference to the accompanying drawings.

DESCRIPTION OF THE PREFERRED EMBODIMENTS

Figure 1:
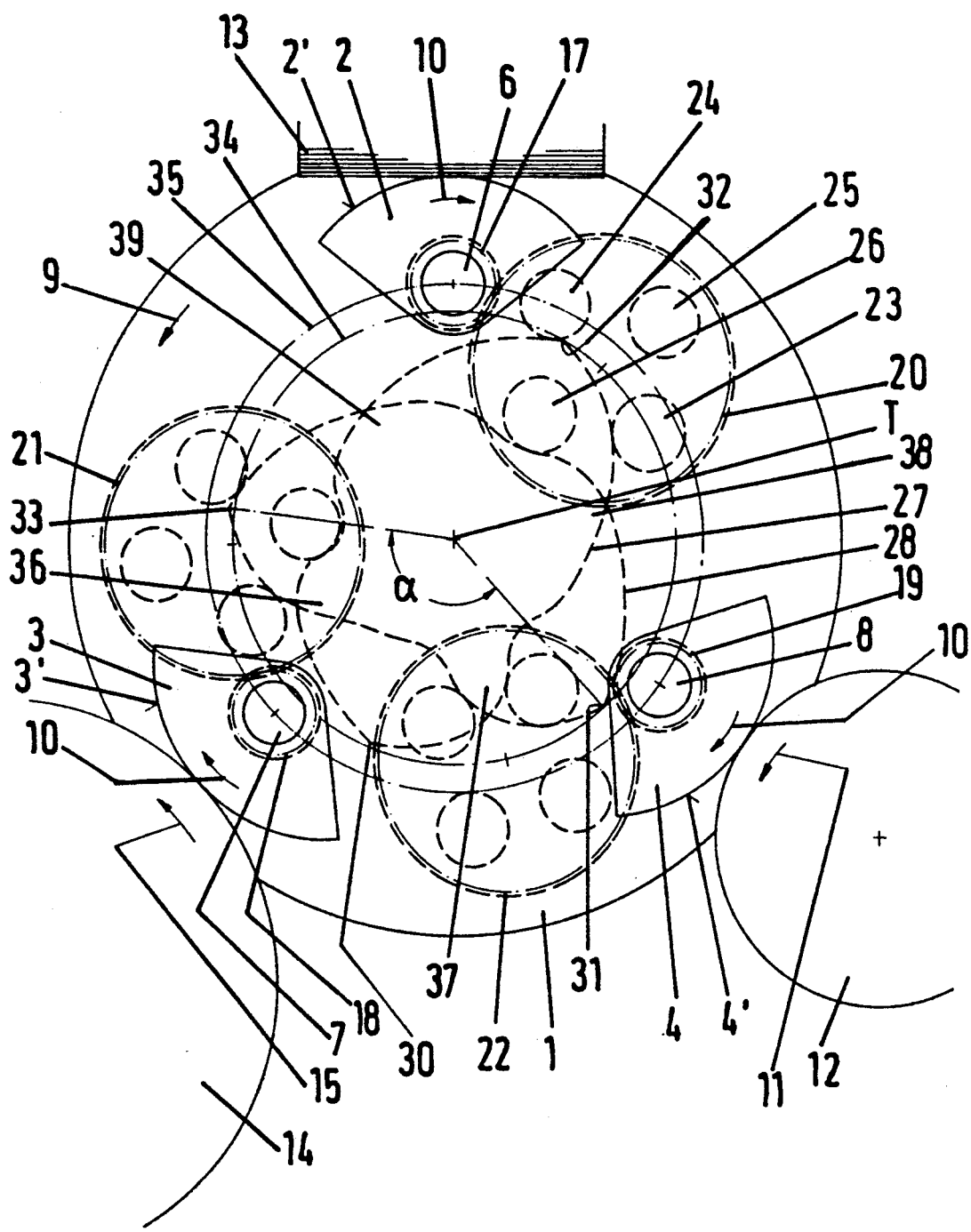
FIG. 1 is a schematic overhead view of a preferred labelling machine including various features of the invention.

The labelling station illustrated in FIGS. 1 to 5 consists of a plate-shaped support 1, on which three extracting elements 2, 3, 4 are located at equal angles. Each extracting element 2, 3, 4 has a cylindrically curved receptacle surface 2', 3', 4' for a label and is mounted between the latter and the center point of its curve on a respective drive shaft 6, 7, 8 in the support 1. When the support 1 is rotated in the direction of the arrow 9, the extraction elements 2, 3, 4 are forced to rotate by a drive mechanism (described below) in the direction of the arrow 10, which is opposite to the directional rotation of the support 1.

During this rotation of the support 1, the extraction elements 2, 3, 4 move past various stations. The stations include a glue roller 12 rotating in the direction of the arrow 11, a stationary label box 13 with a stack of labels inside, and a gripper cylinder 14 rotating in the direction of the arrow 15. Each of the extraction elements 2, 3, 4 executes a roll-off movement at the individual stations. First, adhesive is applied to the receptacle surface 2', 3', 4' of each extraction element 2, 3, 4 by the adhesive roller 12. While rolling past the front label of the stack of labels in the label box 13, the front label is extracted from the label stack as a result of the adhesive action of the adhesive on the receptacle surface 2', 3' 4'. As the support 1 continues to rotate, the label is conducted to the gripper cylinder 14, which removes the label from the receptacle surface 2', 3', 4' and transfers it in a manner not shown herein to objects, such as bottles, moving past the gripper cylinder 14.

In order for the receptacle surface 2', 3', 4' to roll past the variously configured stations 12, 13, 14, it is necessary for the rotation of each extraction element 2, 3, 4 in the direction of the arrow 9 to be accelerated and decelerated. For this purpose, the extracting elements 2, 3, 4 respectively include pinions 17, 18, 19 which are respectively mounted on the drive shafts 6, 7, 8. The pinions 17, 18, 19 are respectively connected with larger gear wheels 20, 21, 22, which are mounted in the direction of rotation behind the corresponding extracting element 2, 3, 4 by means of bearing shafts shown in FIGS. 2 and 3 in the support 1.

Each larger gear wheel 20, 21, 22 is part of a cam drive mechanism. Each of these cam mechanisms has the same structure, so that the following description can be limited to a single cam drive mechanism but is equally applicable for the others.

The larger gear wheel 20 preferably consists of two gear wheels which can be rotated and fixed in relation to one another to remove play therebetween. The gear wheel 20 is part of a support element 51, which sits on the lower end of the bearing shaft 50 mounted in the support 1. The support element 51 consists of an outside body 51a and an inside body 51b. The two bodies 51a, 51b have radially oriented claws, which are engaged with one another. Between the claws is inserted a thin elastic insert 51c made of damping material.

The gear wheel 20 is rigidly connected to the upper part of the outside body 51a. On the underside of the outside body 51a are fastened two diagonally-opposite followers respectively consisting of a bearing neck 25a, 26a and a roller 25b, 26b rotatably mounted thereon. Because of the elastic insert 51c between the outside body 51a and the inside body 51b, there is thus a decoupling for the gear wheel 20 and the followers 25a, 25b, 26a, 26b.

The bearing necks 25a, 26a support, on their underside, a bridge element 52 in the shape of a ring. On the underside of the bridge element 52 are fastened two followers geometrically opposite one another and offset by 90 degrees from the followers 25a, 25b, 26a, 26b. These followers also respectively consist of a bearing neck 23a, 24a and rollers 23b, 24b located thereon.

The two sets of followers 23a, 23b, 24a, 24b, 25a, 25b, 26a, 26b correspond to a double cam disc 53 having two cams 27, 28 with outside camming surfaces. This double cam disc 53 is rigidly connected via a support bridge 54 with the machine frame 55 of the labelling station. The cams 27, 28 have the shape of ovals indented on both long sides, and are oriented crossways to one another.

Figure 2:
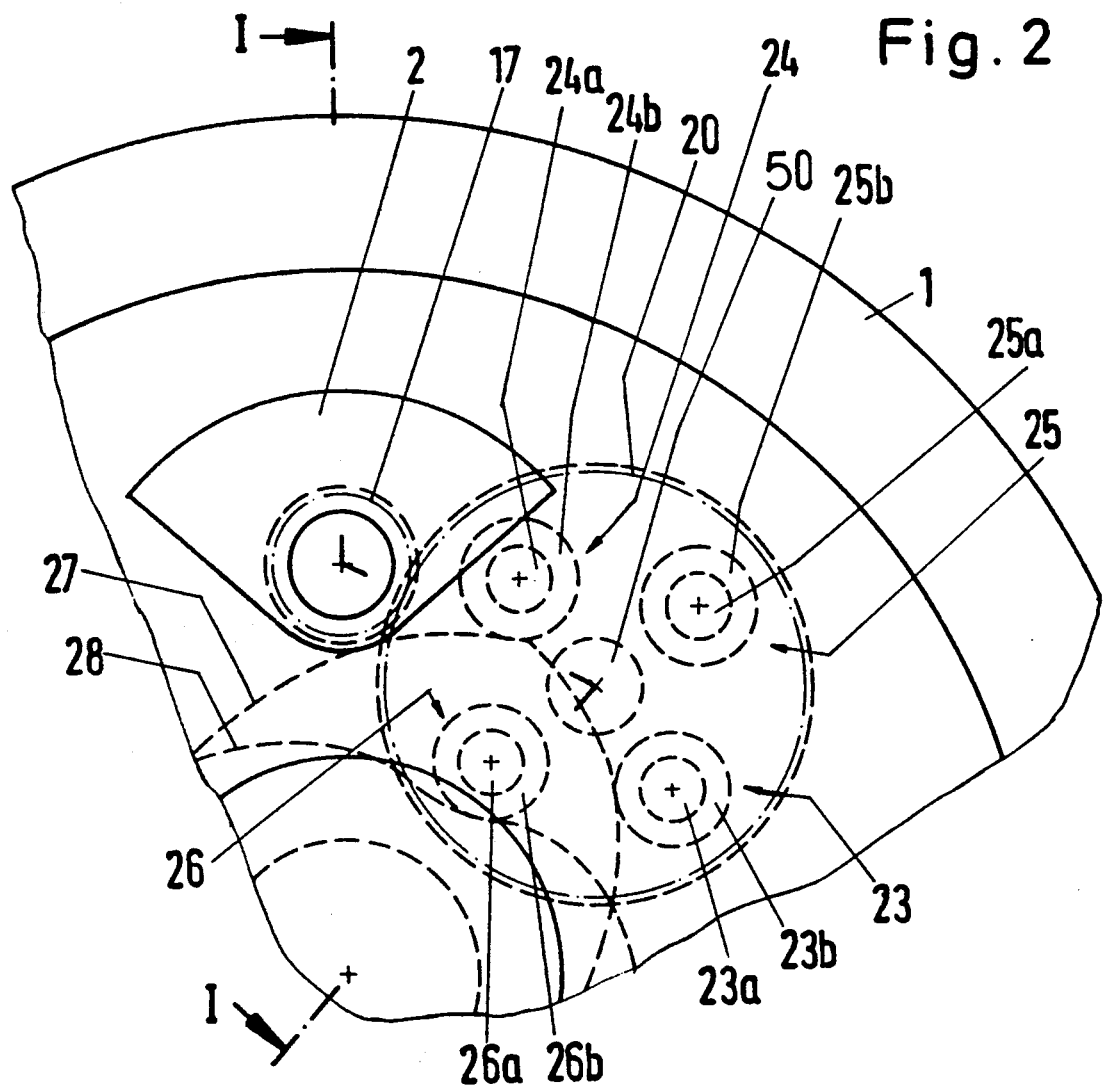
FIG. 2 is a fragmentary overhead schematic view of one of the cam drive mechanisms for one of the extraction elements in FIG. 1.
Figure 3:
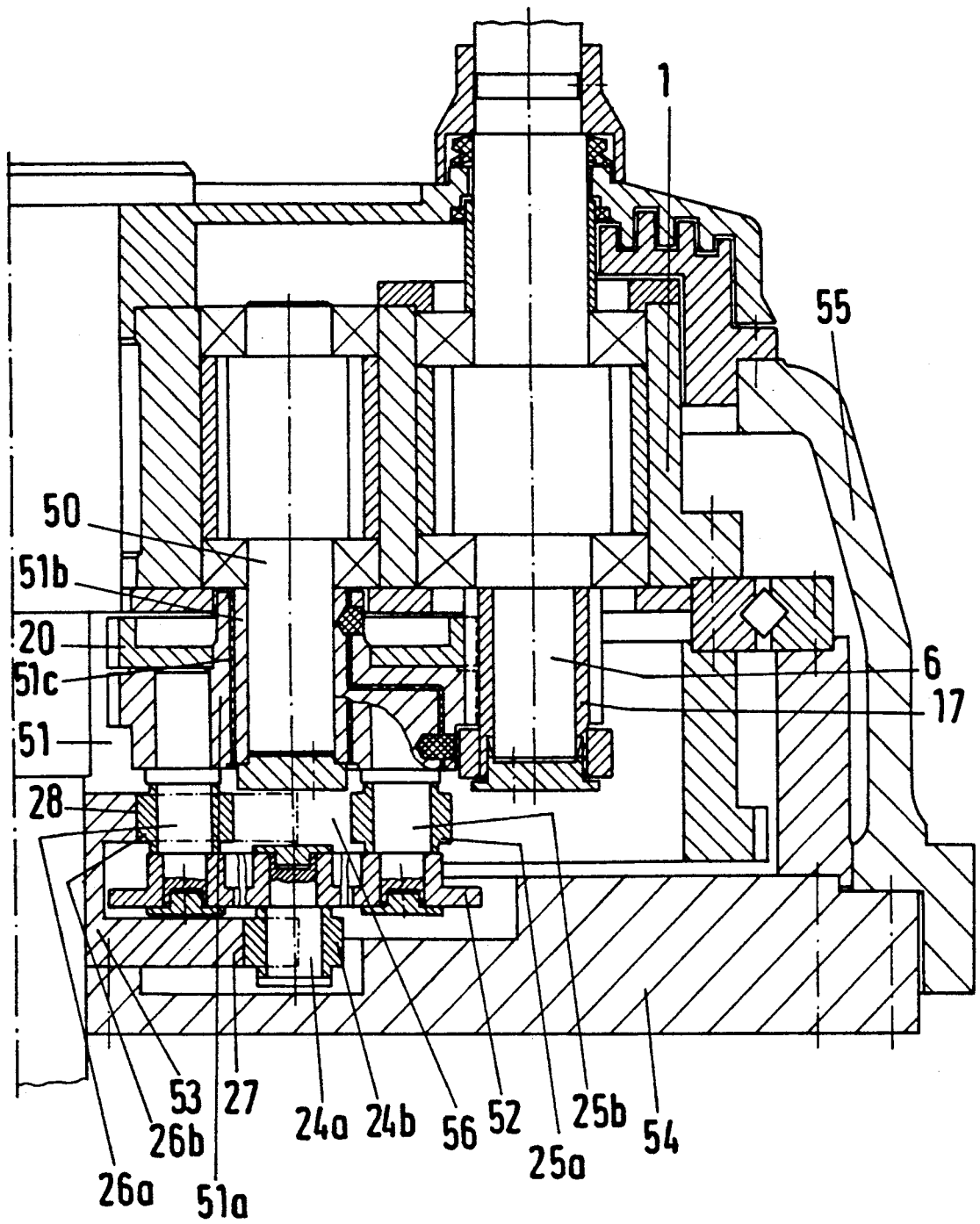
FIG. 3 is a cross section of the cam drive mechanism shown in FIG. 2 as generally seen along Line I—I in FIG. 2.

As shown in FIG. 2 and as indicated by dashed lines in FIG. 3, partial segments of the outside regions of the cams 27, 28 lie in the vicinity of the path of the axis of the bearing shaft 50. However, because of the design with the bridge element 52 lying between the outside portion of the cams 27, 28, in the vicinity of the outside portion of the upper cam 28 in the center between the followers 25a, 25b, 26a, 26b, a shaft-free space 56 is created. In the vicinity of the outside portion of the lower cam 27, the drive or bearing shaft 50 is terminated and does not extend into the level lower cam 27. As a result, the outside portion of the cams 27, 28 can be optimally configured over their entire length so that the entire drive mechanism can be compactly designed with economical components. At each point of the outside portion of the cams, at least one follower is under torque and at least one follower is providing counter support, so that there is always a defined rotational position for the extraction element.

Figure 4:
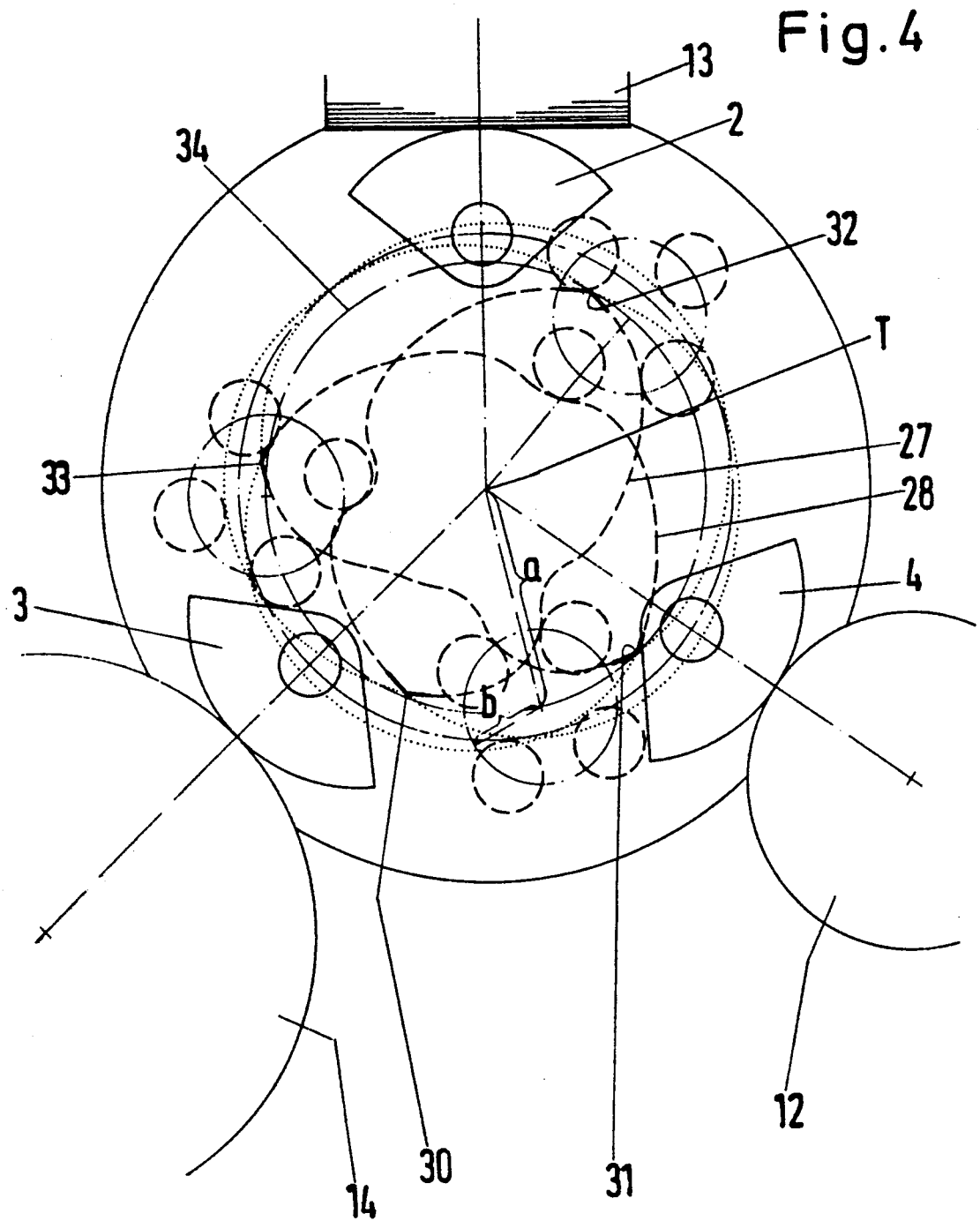
FIGS. 4 through 6 are overhead and smaller scale views of the labelling machine shown in FIG. 1 including specific relationships and features of the invention.
Figure 5:
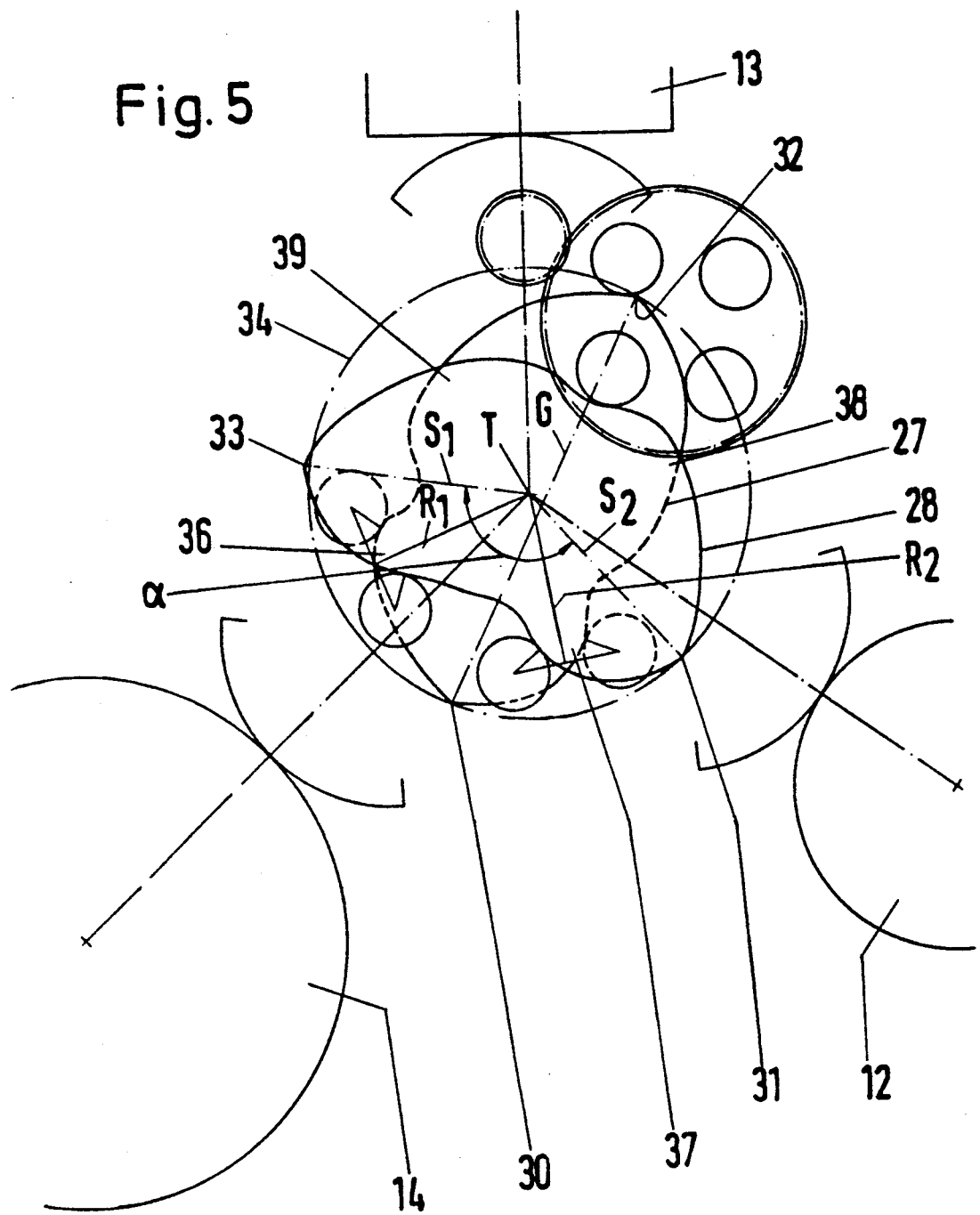
Figure 6:
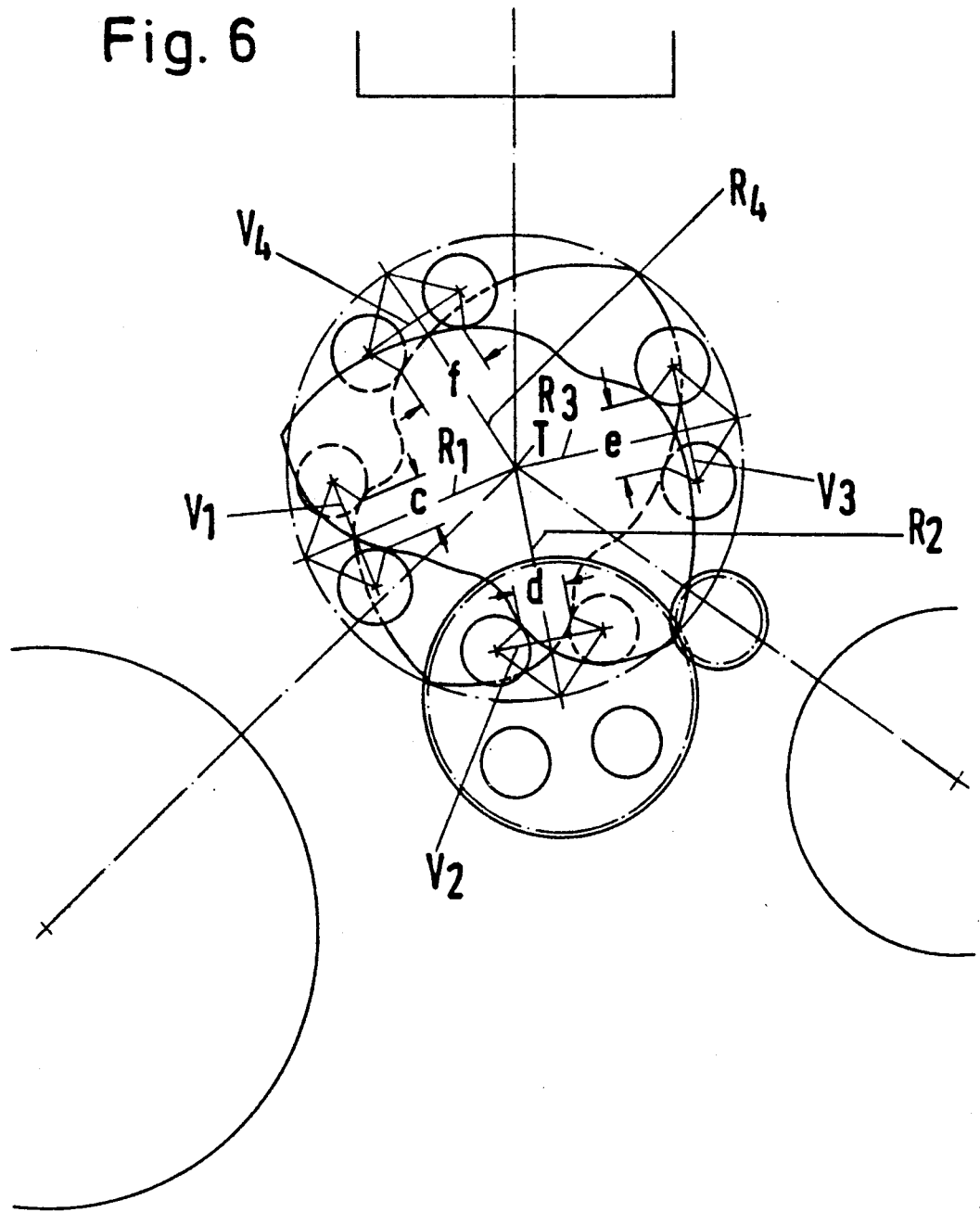

As shown in FIGS. 4-6, the arrangement of the three stations, which include the adhesive roller 12, the label box 13 and the gripper cylinder 14, divides the support 1 into three sectors. In the drawing, these sectors are limited by the dotted lines running through the center of the stations 12, 13, 14. In the sector between the adhesive roller 12 and the gripper cylinder 14 there are two extreme points 30, 31 respectively of the outside regions of the cams 27, 28. In each of the sectors between the adhesive roller 12 and the label box 13, on the one hand, and between the label box 13 and the gripper cylinder, on the other hand, there is always one extreme point 32, 33 of the outside regions of the cams 27, 28. All the extreme points 30, 31, 32, 33 lie practically on the track or path 34 of the mid-point or center of the bearing shaft (not shown) with its support elements for the followers 23, 24, 25, 26 mounted thereon. Only the extreme point 33 lies somewhat outside this track or path 34 of the mid-point or center. The radius a of the track or path 34 of the mid-point preferably has a radius of about 3 to about 1 to the radius b of the orbit of the followers 23, 24, 25, 26. The translation ratio between the pinions 17, 18, 19 and the larger gear wheels 20, 21, 22 engaged therewith is preferably about 1 to about 3.

As also shown in FIGS. 4-6, the extreme points 30, 31, 32, 33 of the outside regions of the cams 27, 28 are determined by the fact that each cam 27, 28 is comprised of two overlapping cams. While the cam segments formed are illustrated in dashed lines, the cam segments which are not formed, and which supplement these formed cam segments are shown in dotted lines. The dotted line represents the path of each of the followers 23, 24 and 25, 26 when the corresponding other followers 24, 23 and 26, 25 are in contact with and guided along a path of the surface of the respective cams 27, 28 represented by the dashed lines.

Figure 7:
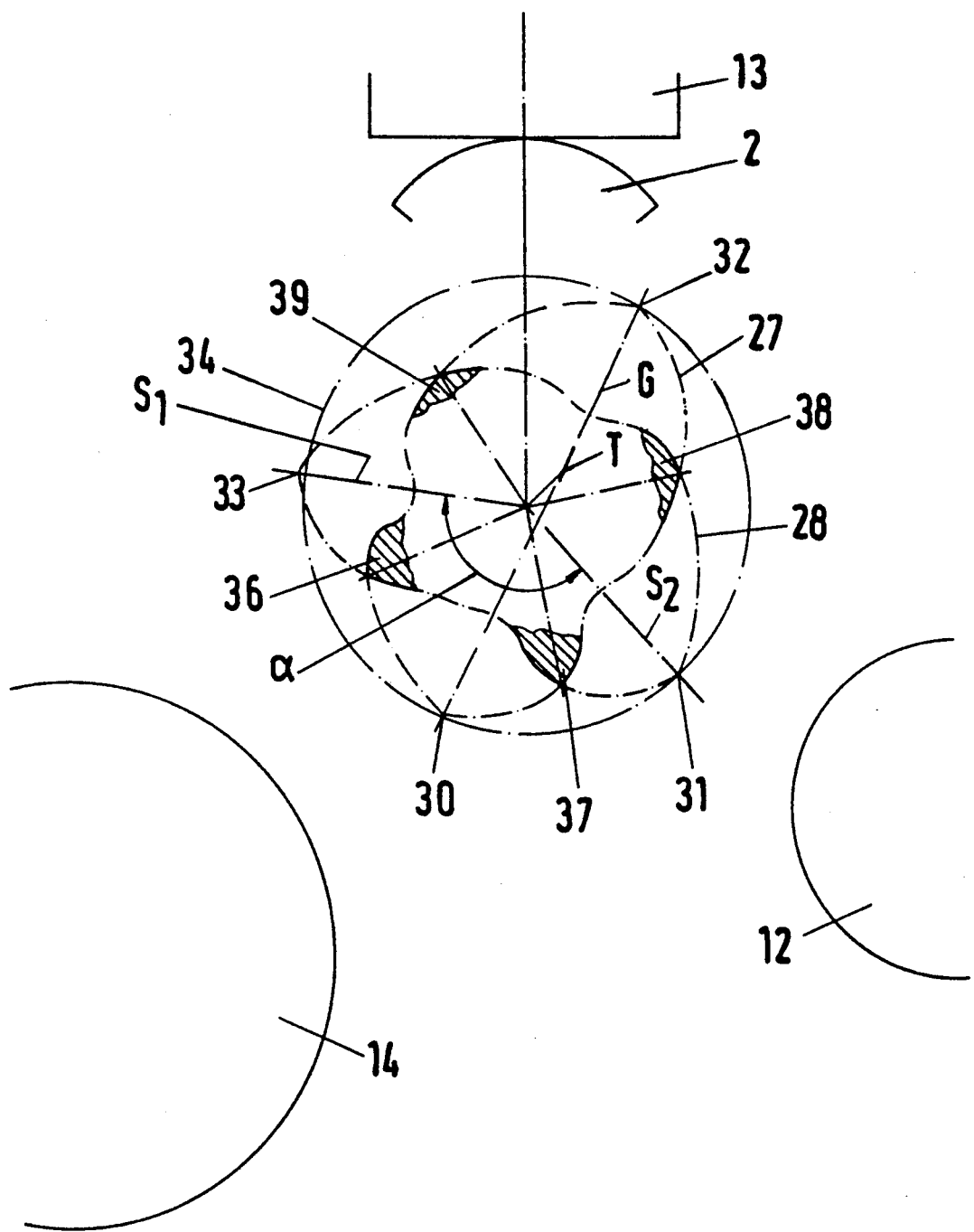
FIG. 7 is a schematic top view of the cams of the labelling machine illustrated in FIG. 1 including the teeth or junctions formed at the overlapping areas of the cams.

FIGS. 5 to 7 show principally the geometric relationships of the two cams 27, 28, which are vertically and rotationally offset from one another with each essentially forming an oval indented on both sides.

FIG. 7 shows principally the teeth or junctions 36 to 38 formed by the two outside curves of the cams 27, 28 in the overlapping area. While the narrower teeth or junctions 36, 37 lie within an obtuse angle $\alpha$, which is bordered by the radial rays or lines $S_1$, $S_2$ emanating from the mid-point T of the support and running through the extreme points 31, 33 of the outside region of the cam 28. The extreme points 30, 32 of the outside region of the other cam 27 lie on a straight line G, which runs generally close to or approximately through the mid-point T of the support.

As shown principally by FIG. 6, the followers 23 to 26 of one of the support elements 51 interact with the teeth or junctions 36 to 39 formed in the overlapping area of the two cams 27, 28. There are distances c, d respectively between the contact points of the followers on the flanks of a narrow teeth or junctions 36, 37, when connecting lines $V_2$, $V_2$ running through the mid-points of the followers are perpendicular to the respective radial rays or lines $R_2$, $R_3$ emanating from the support mid-point T and running through the point of the corresponding teeth 36, 37. The distances c, d are 30% to 40% less than the distances e, f of the contact points of the respective followers on the flanks of the wide teeth or junctions 38, 39. Again, the distances e, f are established connecting lines $V_3$, $V_4$ running through the mid-points of the followers is perpendicular to the respective radial rays or lines $R_3$, $R_4$ emanating from the mid-point T of the support and running through the point of the corresponding teeth 38, 39.

FIGS. 5-7 also show that, on one hand, the points of the narrow teeth or junctions 36, 37 and on the other hand, the points of the wide teeth or junctions 38, 39 are respectively at comparable radial distances from the mid-point T of the support. More specifically, the radial distances of the narrower teeth 36, 37 are greater than those of the wide teeth 38, 39.

Figure 10A:
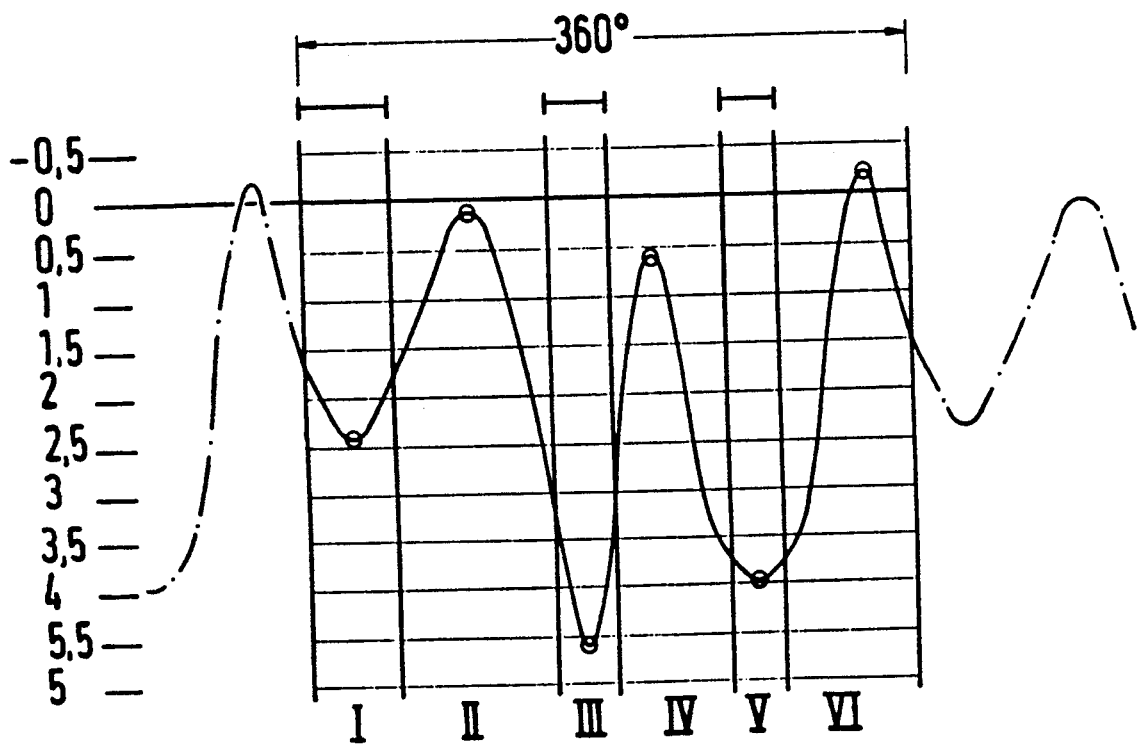
FIG. 10 is a diagram for the angular velocity and angular acceleration of one of the extraction elements of the labelling station illustrated in FIG. 1 including three extracting elements and three transfer regions on the gripper cylinder.
Figure 10B:

The diagram in the top of FIG. 10 shows the angular velocity of the extracting element and the diagram at the bottom of FIG. 10 shows the angular acceleration of the extracting element during a rotation of the extracting element support by 360 degrees around its circumference. The sectors I, III and V respectively represent the roll-off areas at the label box, the gripper cylinder and the adhesive application roller. The sectors II, IV and VI respectively represent the intervening intermediate areas. The diagram shows that in all the regions, the angular velocity only reaches a maximum in each of the rolling regions I, III and V, and a minimum in each of the intermediate regions II, IV and VI. In the intermediate region VI, the region between the adhesive application roller 12 and the label box 13, the angular velocity even becomes negative, which means that the direction of rotation is briefly reversed. The cams are thereby configured so that the maxima and minima always occur approximately in the central portion of the individual regions so that the movement sequence is optimized. The acceleration diagram shows that in the roll-off regions I and V, where rolling contact takes place in the entire region, the acceleration and thus also the load is significantly less than in the adjacent regions. Only in the vicinity of the gripper cylinder is the acceleration approximately as great as in the adjacent regions. It should be noted that here, the two surfaces do not actually roll along one another over the entire region, but are only following one another.

Figure 8:
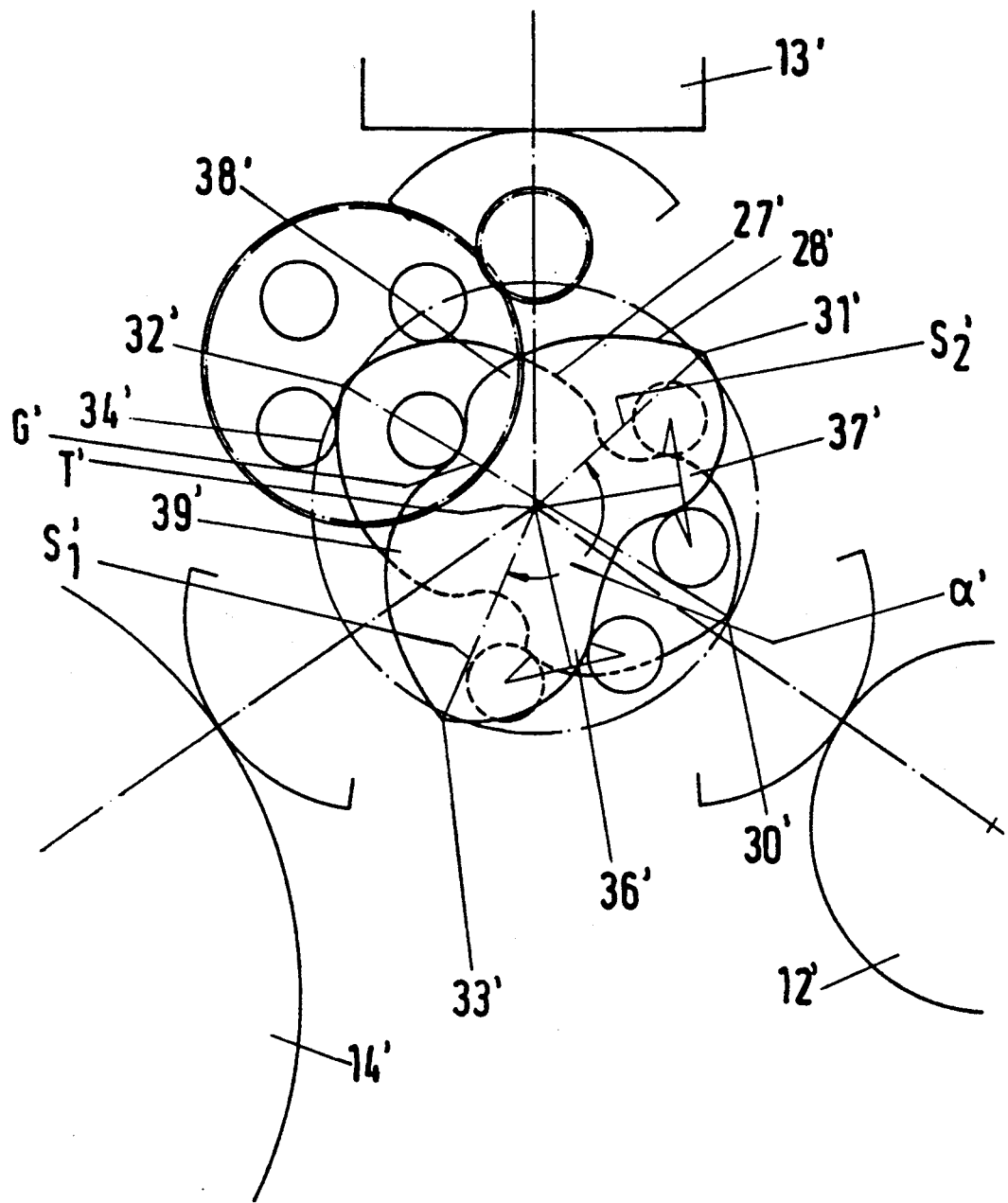
FIG. 8 is a view similar to that of FIG. 5 of an alternative labelling machine.
Figure 9:
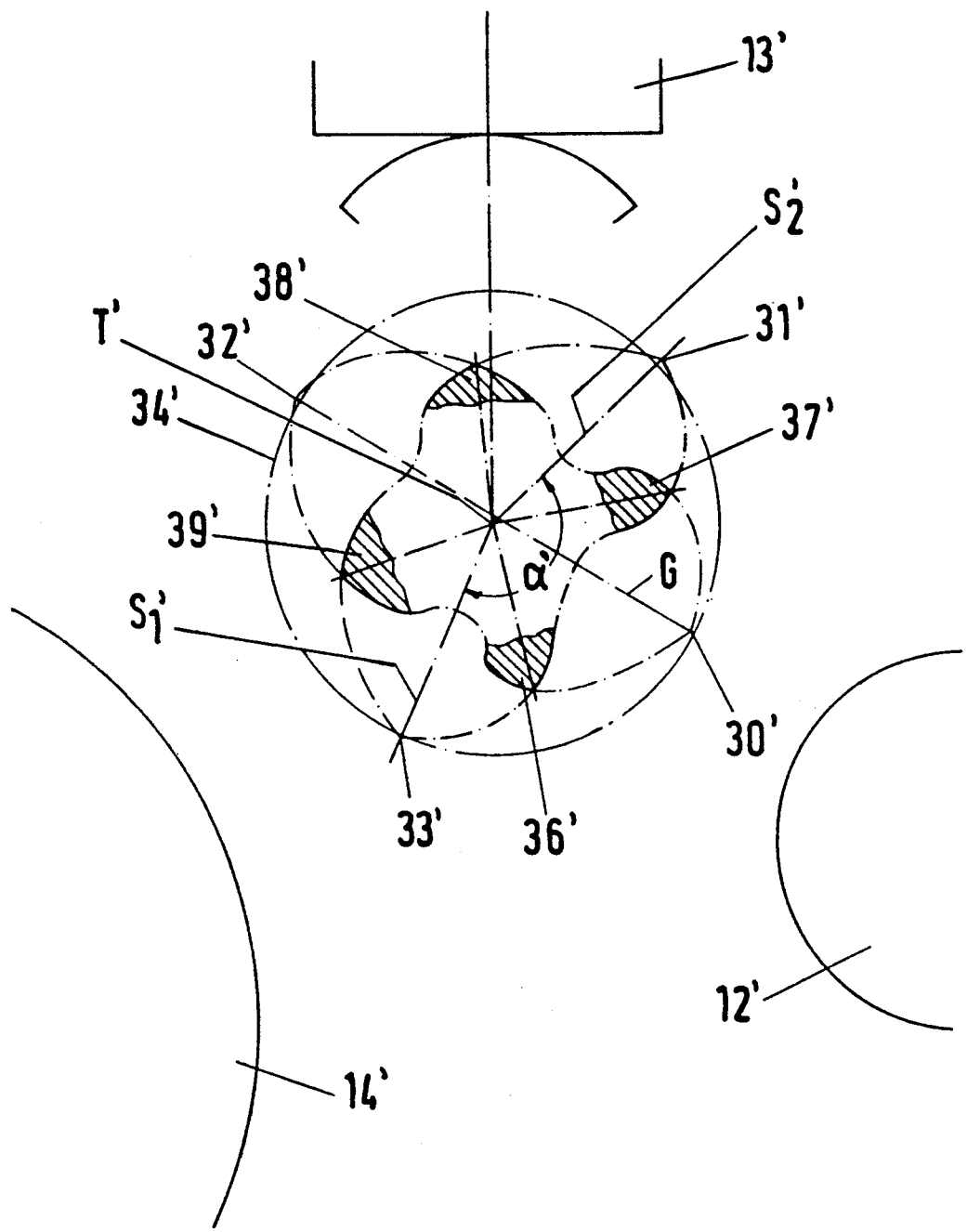
FIG. 9 is a view similar to that of FIG. 7 of cams of the labelling station of FIG. 8 including the teeth or junctions formed at the overlapping of the cams.

The labelling station in accordance with FIGS. 8 and 9 differs from that illustrated in FIGS. 1 to 7 only in that the support element with the followers precedes the extracting element and that the gripper cylinder has a larger diameter. The illustrations in FIGS. 8 and 9 are similar to those in FIGS. 5 and 7 of the labelling station shown in FIG. 1. Since the relationships with regard to the design of the cams 27, 28 are the same in principle, additional explanations in terms of FIGS. 1, 2, 3, 4, 5, 6, 7 and 10 should be unnecessary. The equivalent components of FIGS. 8 and 9 relative to the components of FIGS. 5 and 7 are identified by the same reference numbers plus an apostrophe. Although the specific velocities and accelerations of the extracting elements for the machine of FIGS. 8 and 9 would be different from those shown in FIG. 10 for the machine of FIG. 1, the same rotational principals would still exist.

As generally described above, the preferred labelling machine for objects, such as bottles or the like, includes several stations located behind one another along a track. The stations include an adhesive application apparatus 12, a label feed station 13 and a label transfer station 14. The machine includes at least one extracting element 2, 3, 4 for the labels, mounted so that it can rotate on a rotating support 1 and be moved past the stations 12, 13, 14 during each rotation of the support 1. The extracting element has an outwardly-curved receptacle surface 2', 3', 4' for the label which rolls along the stations 12, 13, 14. The drive for each extracting element 2, 3, 4 is a cam drive, which comprises common, stationary double cam discs 53 for all the extracting elements 2, 3, 4 with cams 27, 28 located in two planes with one above and at some distance from the other. In some embodiments, the two sets of followers 23, 24, 25, 26 may be mounted on each of the drive shafts 6, 7, 8 of the extracting elements 2, 3, 4. Preferably, the two sets of followers 23, 24, 25, 26 are mounted on each of the bearing shafts 50, which is coupled with each of the drive shafts, by means of a support element 51. By means of a form-fit with the two cams 27, 28, the followers produce positive movement of each extracting element 2, 3, 4 over its entire revolution when the support 1 rotates. The labelling machine is characterized by the fact that each bearing shaft 50 ends in front of the plane in which the first cam 28 closer to the shaft 50 lies. The followers 23, 24 which correspond to the other second cam 27 are mounted on a bridge element 52 lying between the two cams 27, 28. The bridge element 52 is supported by spacer elements 25a, 26a on the support element 51. The spacer elements 25a, 26a lie outside the area 56 covered by the relative movement of the first cam 28.

The labelling machine can include the followers 25, 26 of the first cam 28 encompassing the spacer elements 25a, 26a. The two followers 23, 24, 25, 26 which correspond to each set are located opposite one another in relation to the axis of the drive or bearing shaft 50, and the followers 23, 24 of the one set are radially offset by 90 degrees from the followers 25, 26 of the other set. The followers 25, 26 may have pivots 25a, 26a, as the bridge element 52 is supported on its one side by the pivots 25a, 26a corresponding to the first cam 28, and on its other side supports the pivots 23a, 24a corresponding to the second cam 27. The followers 23, 24, 25, 26 preferably include rollers 23b, 24b, 25b, 26b which are mounted on the pivots 23a, 24a, 25a, 26a.

The labelling machine may also be characterized by the fact that the double cam disc 53 which has cams 27, 28 is located inside the orbit with the followers 23, 24, 25, 26, and is connected by means of a support bridge 54 located under the followers 23, 24, 25, 26 with the machine frame 55. Additionally, the support element 51 of the followers 23, 24, 25, 26 may consist of an external body 51a supporting the followers 23, 24, 25, 26 and an internal body 51b connected with it by means of an insert 51c made elastic damping material. The two bodies 51a, 51b are positively engaged with one another in the vicinity of the insert 51c by means of radially oriented claws. The body 51a supporting the followers 23, 24, 25, 26 may support a drive pinion 20.

Still further, the labelling machine may be characterized by the fact that of the radial extreme points 30, 31, 32, 33 of the outside surfaces of the two cams 27, 28, two extreme points 30, 31 lie in the sector between the gripper cylinder 14 and the adhesive roller 12. The other two extreme points 32, 33 respectively lie in the other two sectors formed between the label transfer station designed as a gripper cylinder 14, the label supply station designed as a label box 11, and the adhesive application apparatus designed as the adhesive roller 10. At least one of the extreme points 30, 31, 32, 33 of the two outside cams 27, 28 may lie outside the path 34 of the mid-point of the support element 51 of the followers 23, 24, 25, 26.

The preferred labelling machine may be characterized by the fact that with a transmission located between the drive shaft 6 of the extracting element 2 and the support element 51, a translation ratio may be about 1 to about 3. When the axis of the drive shaft 6 of the extracting element 2 is outside the path 34 of the mid-point of the support element 51, and the central position of the extracting element is in front of the labelling supply station designed as a label box 11, a pair of followers 23, 24 is engaged by means of both followers 23, 24 with the outside cam 27. The ratio of the radius a of the path of the mid-point 34 of the support element 51 to the radius b of the orbit of the followers 23, 24, 25, 26 on the support element 51 may be about 3 to about 1.

The labelling machine may be further characterized by the fact that the non-load-bearing cam path segments of the cams 27, 28 described by the followers 23, 24, 25, 26 lie for the most part outside the path 35 of the mid-point of the drive shaft 6 of the extracting element 2.

The preferred labelling machine may include the following features:

The extreme points 31, 33 of one of the two outer cams 27, 28 may lie on rays $S_1$, $S_2$ emanating radially outward from the center point T of the support to enclose an obtuse angle $\alpha$ therebetween.

Of the teeth or junctions 36, 37, 38, 39 which are formed in the overlapping areas of the two outer cams 27, 28 and with which simultaneously the followers 23, 24, 25, 26 of both sets interact, the narrower teeth 36, 37 lie inside the obtuse angle $\alpha$.

The obtuse angle $\alpha$ is 120 degrees to 160 degrees, in particular 140 degrees.

The extreme points 30, 32 on the other outside cam 27 lie on a straight line G running near or approximately through the mid-point of the support T.

The distance c, d between the contact points of the followers 23, 24, 25, 26 on the flanks of one of the narrow teeth or junctions 36, 37 formed by the overlapping regions of the two cams 27, 28 is about 30% to about 40% less than the corresponding distance e, f for a corresponding wide tooth or junction 38, 39, when the connecting line running through the mid-point of the followers 23, 24, 25, 26 in contact with the tooth or junction 36, 37 is perpendicular to the radial ray or line $R_1$, $R_2$ emanating from the mid-point T of the support and running through the point of the tooth 36, 37.

The extreme points 30, 31, 32, 33 tend to lie on a circle 34 around the mid-point of the support T.

The points of the teeth 36, 37, 38, 39 formed by the overlapping areas of the outside cams 27 28 lie inside the circle 34 for the extreme points 30, 31, 32, 33 and are at a different radial distance from the circle or mid-point T of the support.

The radial distances of the peaks of the narrow teeth 36, 37 formed by the overlapping areas of the two outer cams 27, 28 from the mid-point T of the support are substantially equal.

The radial distances between the peaks of the wide teeth 38, 39 formed by the overlapping areas of the two outside cams 27, 28 and the support midpoint T are substantially equal.

The radial distance between the points of the narrow teeth 36, 37 formed by the overlapping areas of the two outside cams 27, 28 is greater than the radial distance of the wide teeth 38, 39.

The labelling station may be further characterized by the fact that, because of the outside curve of the two cams 27, 28, the angular velocity of each individual extracting element 2, 3, 4 in the roll-off area of the stations 12, 13, 14 reaches only a maximum, and in the intermediate areas in between, it reaches only a minimum.

The maxima and minima of the angular velocity always lie approximately in the center of the roll-off area or of the intermediate area. The minimum angular velocity in the intermediate areas is less than one-half the maximum angular velocity in the roll-off areas. The angular velocity is preferably greatest in the vicinity of the gripper cylinder 14. The rotational motion of each individual extracting element 2, 3, 4 is decelerated to at least zero in at least one intermediate region and is then accelerated once again up to the roll-off velocity.

Figure 11:
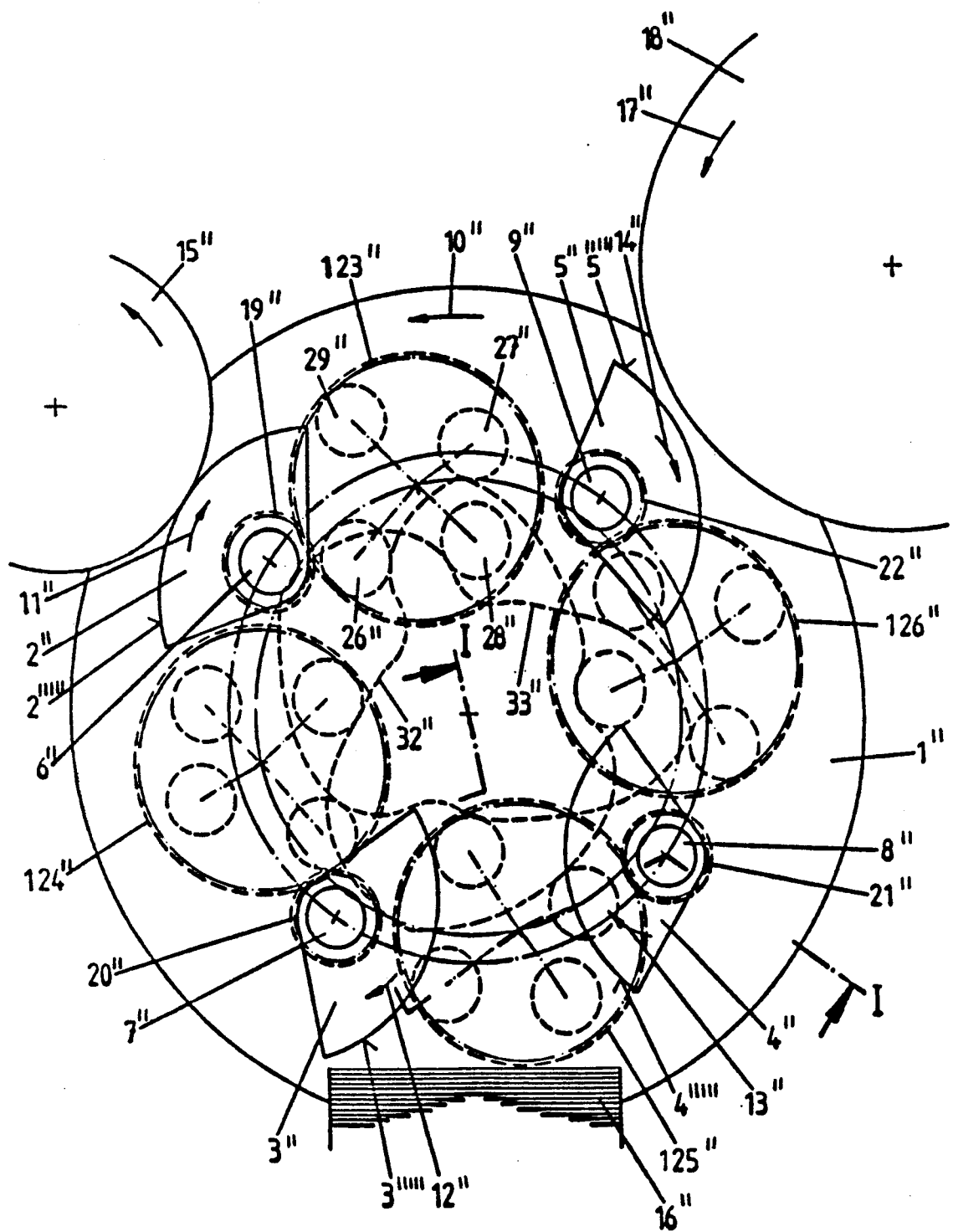
FIG. 11 is a schematic overhead view of another preferred labelling machine.

As generally seen in FIG. 11, the preferred labelling machine comprises a plate-shaped support 1'', on which there are four extracting elements 2'', 3'', 4'', 5'' at equal angles to one another. Each extracting element 2'', 3'', 4'', 5'' has a cylindrically curved receptacle surface 2''''', 3''''', 4''''', 5''''' for a label and is mounted between the surface and the midpoint of its curvature by means of a drive shaft 6'', 7'', 8'', 9'' in the support 1''. When the support 1'' rotates in the direction of the arrow 10'', the extracting elements 2'', 3'', 4'', 5'' are respectively rotated by means of a drive mechanism, as to be described below, in the same direction, in the direction of the arrows 11'', 12'', 13'', 14'', which is in the direction opposite to that of the support 1''.

During the rotation of the support 1'', the extracting elements 2'', 3'', 4'', 5'' are rolled past various stations including an adhesive application roller 15'' rotating in the direction of the arrow as shown thereon, a stationary label box 16'' with a stack of labels inside it, and a label transfer cylinder or gripper cylinder 18'' rotating in the direction of the arrow 17''. Each extracting element executes a rolling motion as it rolls past the individual stations. Initially, adhesive is applied to the receptacle surfaces 2''''', 3''''', 4''''', 5''''' of each extracting element 2'', 3'', 4'', 5'' by the adhesive application roller 15''. As the extracting element rolls past the outer label of the stack of labels in the label box 16'', the outer label is extracted from the label stack as a result of the adhesive action of the adhesive on the receptacle surface 2''''', 3''''', 4''''', 5'''''. As the support 1'' continues to rotate, the extracting element is conducted to the gripper cylinder 18'', which takes the label from the receptacle surface 2''''', 3''''', 4''''', 5''''' and for subsequent transfer of the label to objects being moved past the gripper cylinder 15", such as bottles or the like (not shown).

In order for the receptacle surface 2''''', 3''''', 4''''', 5''''' to roll past the variously-configured stations 15", 16", 18", it is necessary to accelerate and decelerate the rotation of each extracting element 2", 3", 4", 5" in the direction of the arrow 11", 12", 13", 14". For this purpose, each extracting element 2", 3", 4", 5" is respectively connected by means of a pinion 19", 20", 21", 22" sitting on its respective drive shaft 6", 7", 8", 9" with a larger gear wheel 123", 124", 125", 126". Each gear wheel is mounted in the direction of rotation behind its corresponding extracting element 2", 3", 4", 5" by means of a bearing shaft (not shown) in the support 1".

Each of the larger gear wheels 123", 124", 125", 126" is part of a cam transmission mechanism. Each of the cam transmission mechanisms has the same design, so that the following description is directed to the cam transmission mechanism corresponding to the extracting element 2" as illustrated in detail in FIG. 12.

On the lower end of the bearing shaft 25" of the cam transmission mechanism for the larger gear wheel 125" mounted in the support 1" is a support element 14" without any relative rotation therebetween. The support element 24" consists of an outside body 24a" and an inside body 24b". The outside body 24a" has claws or fingers pointing inward, and the inside body 24b" has claws or fingers pointing outward and lying between the claws pointing inward. Between the two bodies 24a" and 24b", and thus also between the engaged claws or fingers thereof, there is an insert 24c" made of elastic material.

Figure 12:
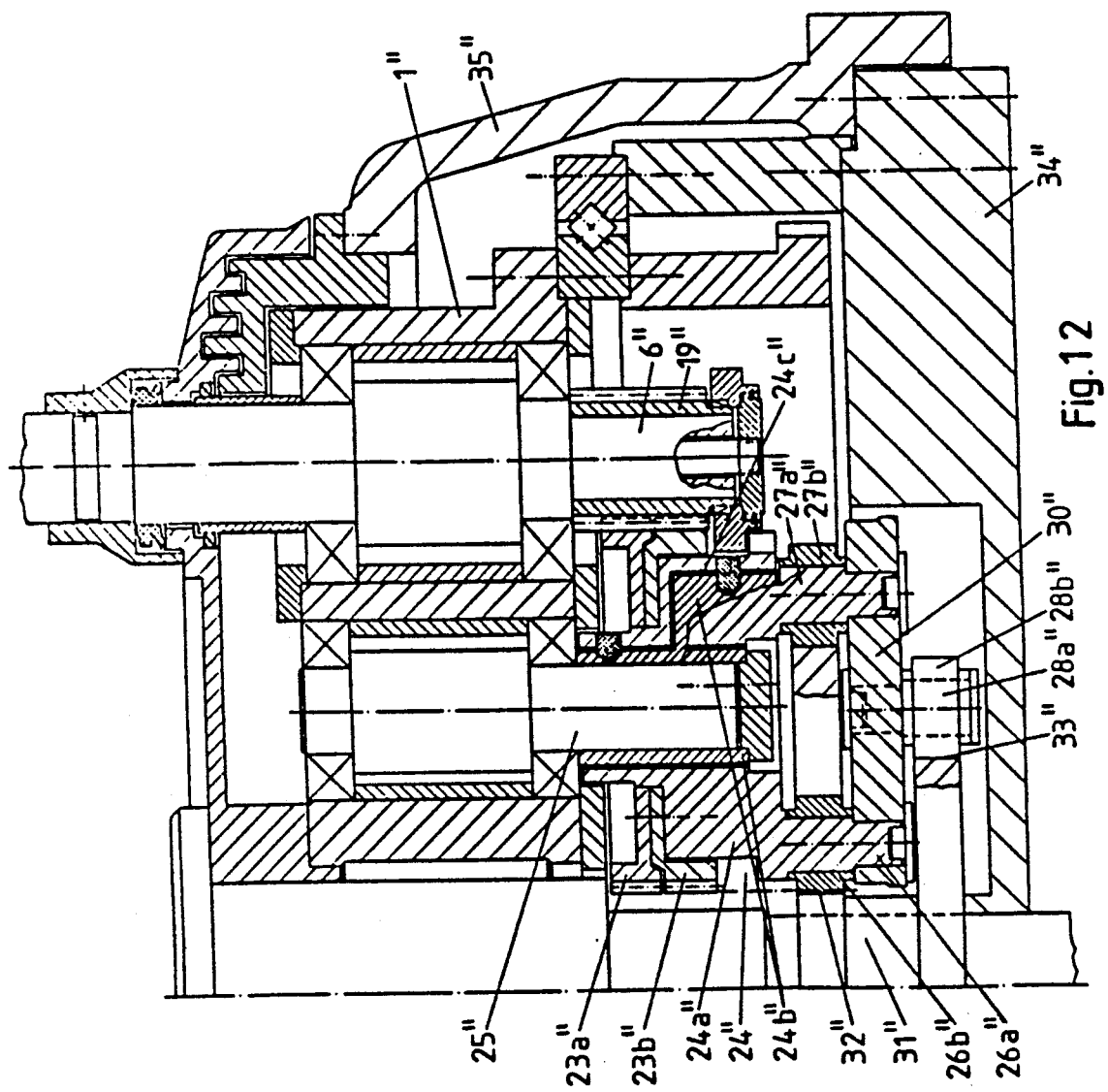
FIG. 12 is a fragmentary cross-sectional view of a preferred cam transmission mechanism of the labelling machine as seen along the line I—I of FIG. 1.

The outer body 24a", on a radially recessed upper projection thereof, supports the larger gear wheel 125", which consists of two gear wheels 23a", 23b" which can be rotated to eliminate any play therebetween them. The wheels 23a" and 23b" are fastened to the outer body 24a" by means of threaded fasteners (not shown). On the underside of the support element 24" are fastened two opposite followers 26", 27" respectively consisting of a bearing pin 26a", 27a" and a roller 26b", 27b" mounted for rotation thereon. The bearing pins 26a", 27a" are integrally connected to the nonrecessed lower part of the support element 24". As can be seen in FIG. 12, and also in FIG. 11, the roller 26b" with its outer periphery projects beyond the arc of the gear wheel 125", 23a", 23b". With such a geometry, it would not be possible to achieve a sturdy embodiment with a two-piece construction, in which the corresponding bearing pin 26a" would have to be installed in a hole in the support element 24".

Both of the bearing pins 26a", 27a", at the undersides thereof, support a bridge element 30" in the form of a ring, on the under side of which are fastened two opposite followers 28", 29". Although only follower 28" is shown, the followers 28", 29" are offset from the followers 26", 27". The follower 28" also consists of a bearing pin 28a" and a roller 28b" mounted for rotation thereon. Each of the followers 26"-29", as shown in FIG. 11, are offset from adjacent followers by an angle which is between 70 degrees and 110 degrees and is not necessarily equal to 90 degrees. Moreover, the followers 26"-29" are at a different radial distance from the axis of the bearing shaft 25" and, therefore, are engaged by means of different lever arm lengths. In each plane there is one follower with a long lever arm and one follower with a short lever arm. Corresponding to the two sets of followers 26"-29" is a double cam disc 31" with two outside cams 32", 33" having outside operating surfaces. This double cam disc 31" is rigidly connected by means of a support bridge 34" within the machine frame 35" of the labelling machine. The outside cams 32", 33" have the basic shape of ovals indented on both long sides, and are oriented crossways to one another.

As shown in FIG. 11 and indicated by a dotted line in FIG. 12, the outside cams 32", 33" lie with partial segments thereof in the vicinity of the axis of the bearing shaft 25". Because of the design with the bridge element 30" lying between the outer cams 32", 33", a shaft-free space (not shown) has been created in the vicinity of the outside cam 32" in the center between the followers 26", 27". Of course, the bearing shaft 25" does not extend into the vicinity of the lower outside cam 33". As a result, the outside cams 32", 33" can be optimally and economically configured over their entire length into compact components. At each point of the outside curves of the cams 32", 33", there is at least one follower transmitting torque and at least one follower providing support from the other side, so that there is always a defined rotational position for the corresponding extracting element.

Figure 13:
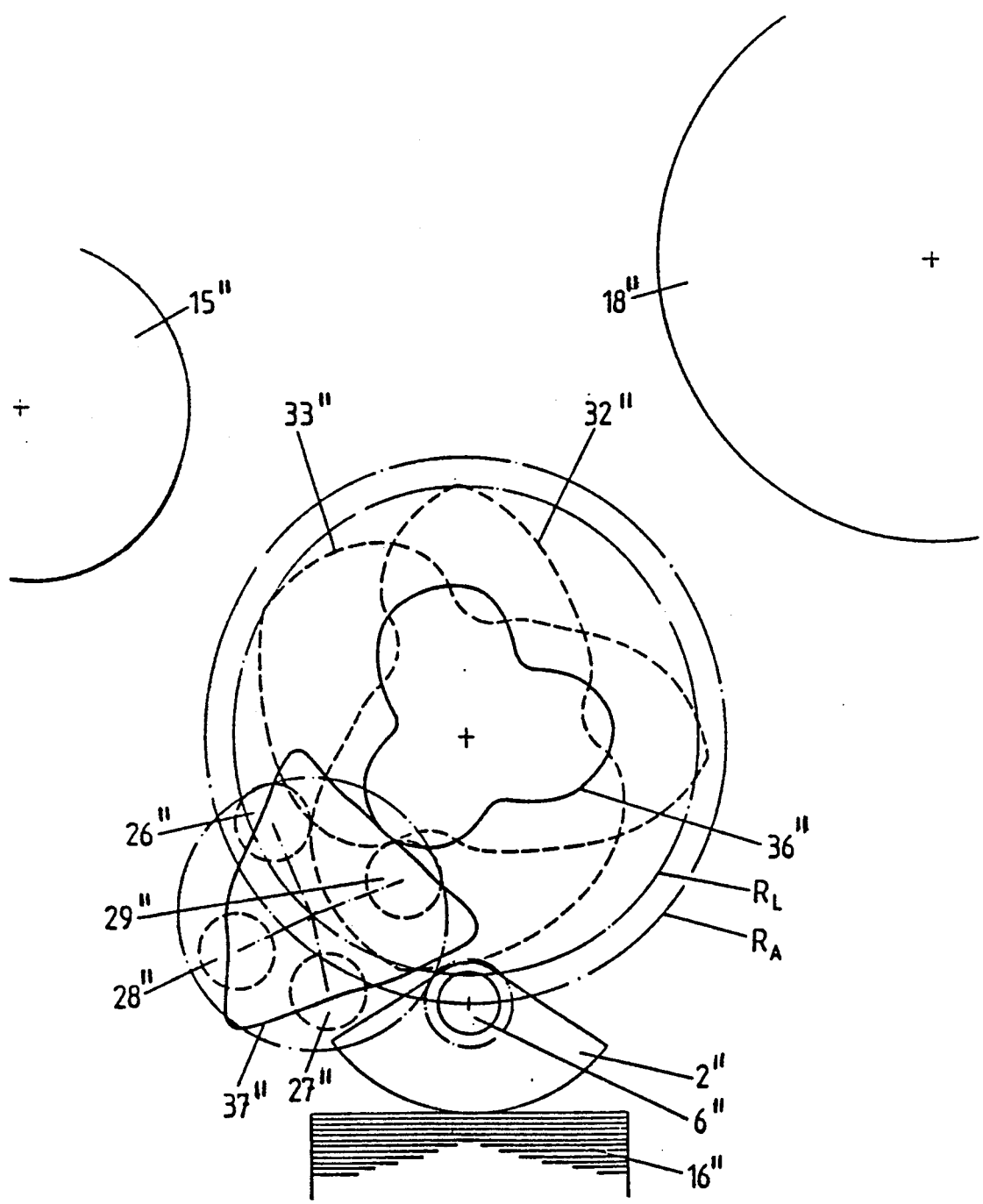
FIG. 13 is a schematic overhead view, on a smaller scale, of the labelling machine illustrated in FIG. 1, with the outside cams shown raised.

FIG. 13 shows, by way of example for a cam transmission mechanism, a fixed equivalent cam surface 36" and the corresponding moving equivalent cam surface 37". The fixed equivalent cam surface 36" and the moving equivalent cam surface 37" represent cams in which there would be relative rolling contact on a point by point basis between the two cam surfaces thereof. The fixed equivalent cam surface 36" has the same axis as and represents the cams 32", 33" while the moving equivalent cam surface 37" has the same axis as and represents the same motion about the axis as the followers 26"-29". As a result, the fixed equivalent cam surface 36" and the moving equivalent cam surface 37" would follow the same relative motions as the cam transmission realized with the two outside cams 32", 33" and the corresponding followers 26"-29". In other words, the center axis of both the followers 26"-29" and the moving equivalent cam surface 37" would evolve about the center of the cams 32", 33" or the fixed equivalent cam surface 36" at the same rate. Further, the changing relative rotation about the center axis of the followers 26"-29" and the moving equivalent cam surface 37" would be identical in either case.

As seen in FIG. 13, the axes of all the followers 26"-29" lie within the movable equivalent cam surface 37", while portions of their periphery outer surfaces remain outside the movable equivalent cam surface. FIG. 13 also shows that the orbit $R_L$ of the bearing shaft 25" lies inside the orbit $R_A$ of the drive shaft 6* of the extracting element. This geometry also contributes to the compact structure.

Figure 14:
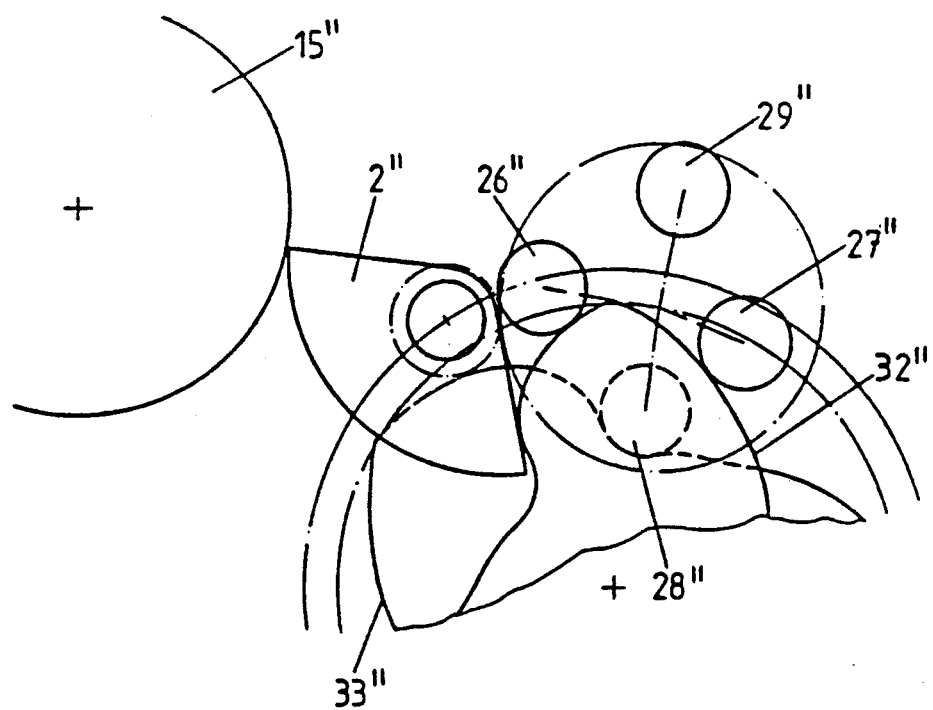
FIGS. 14 and 15 are schematic, fragmentary views of the labelling machine shown in FIG. 1 in two phases of the rolling of an extracting element past an adhesive application roller.
Figure 15:
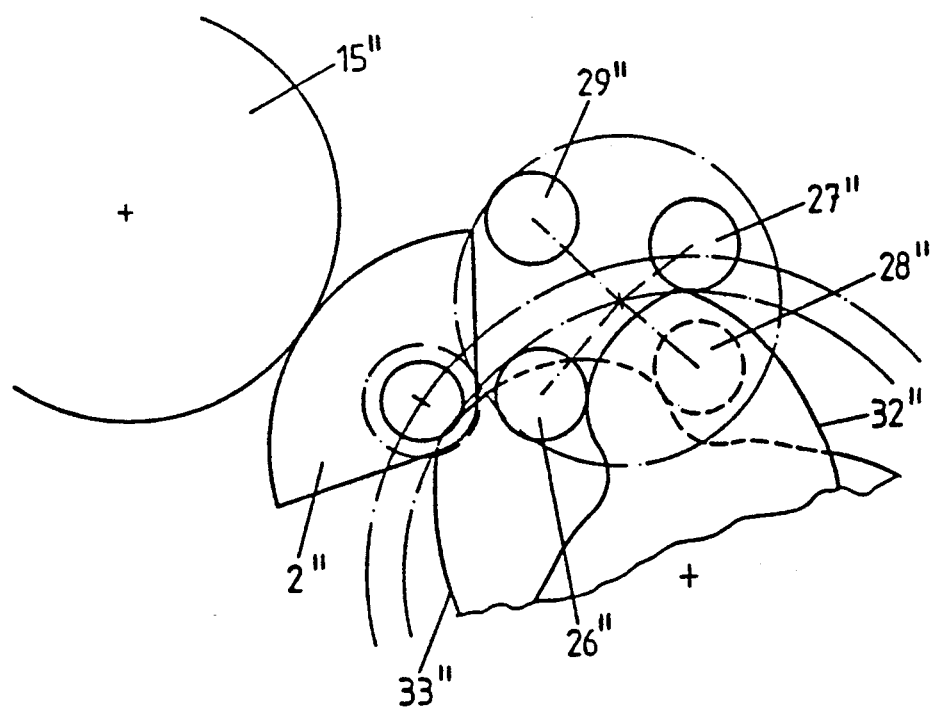

FIGS. 14 and 15 show the engagement of the followers when one of the extracting elements 2" is being aligned with the adhesive application roller 15". At the beginning of the rolling sequence shown therein, the two followers 27", 28" are engaged and transmitting torque, and the follower 26", with a long lever arm, provides support from the other side. In this initial phase, which is particularly important for the application of the adhesive, there is an optimal guidance as a result of the double engagement of the two followers with short lever arms and the supporting follower with a long lever arm. In the rest of the rolling sequence, where the requirements for the guidance of the extracting element 2" are no longer as critical, the engagement of one of the followers with a short lever arm can be eliminated. The instant just prior to the loss of engagement with follower 27" is depicted in FIG. 15.

Figure 16:
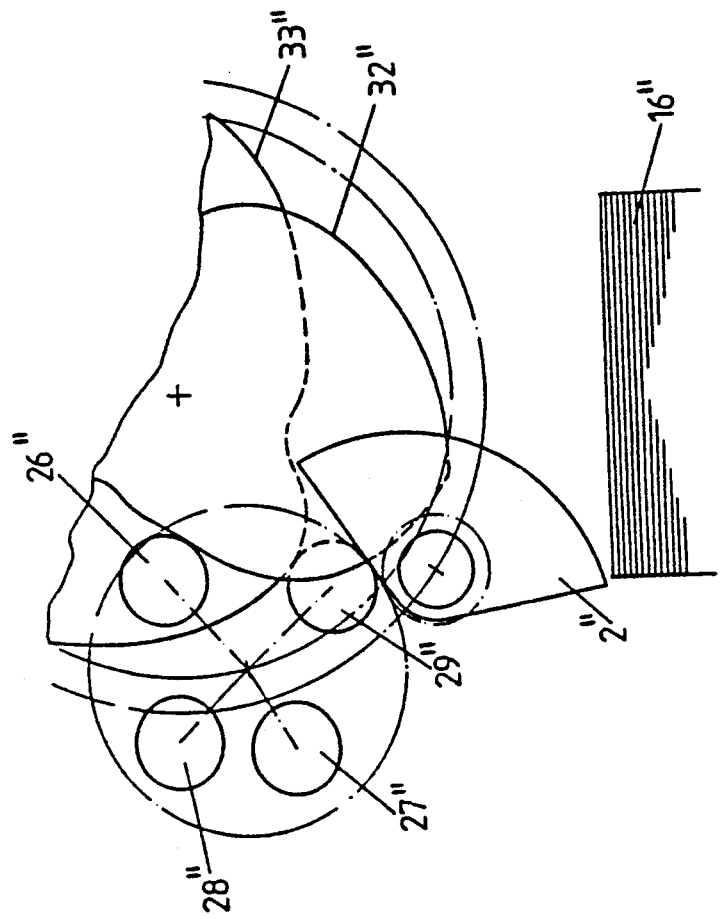
FIGS. 16 and 17 are schematic, fragmentary views of the labelling machine shown in FIG. 1 in two phases of the rolling of an extracting element past a label box.
Figure 17:
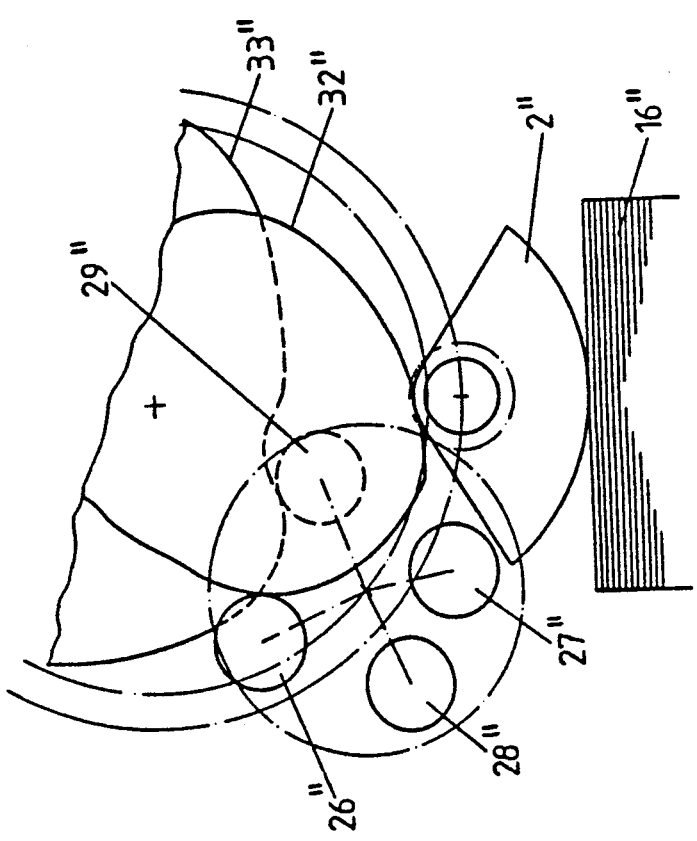

In the vicinity of the label box 16", as seen in FIGS. 16 and 17, the two followers 26", 29" with a large lever arm are shown in the engaged state. From the beginning of the rolling sequence until at least the middle, the follower 26" closest to the bearing shaft transmits torque, while the follower 29" provides support from the other side. Because of the proximity of the follower 26" with a long lever arm to the bearing point, the result is also a very precise guidance.

Figure 18:
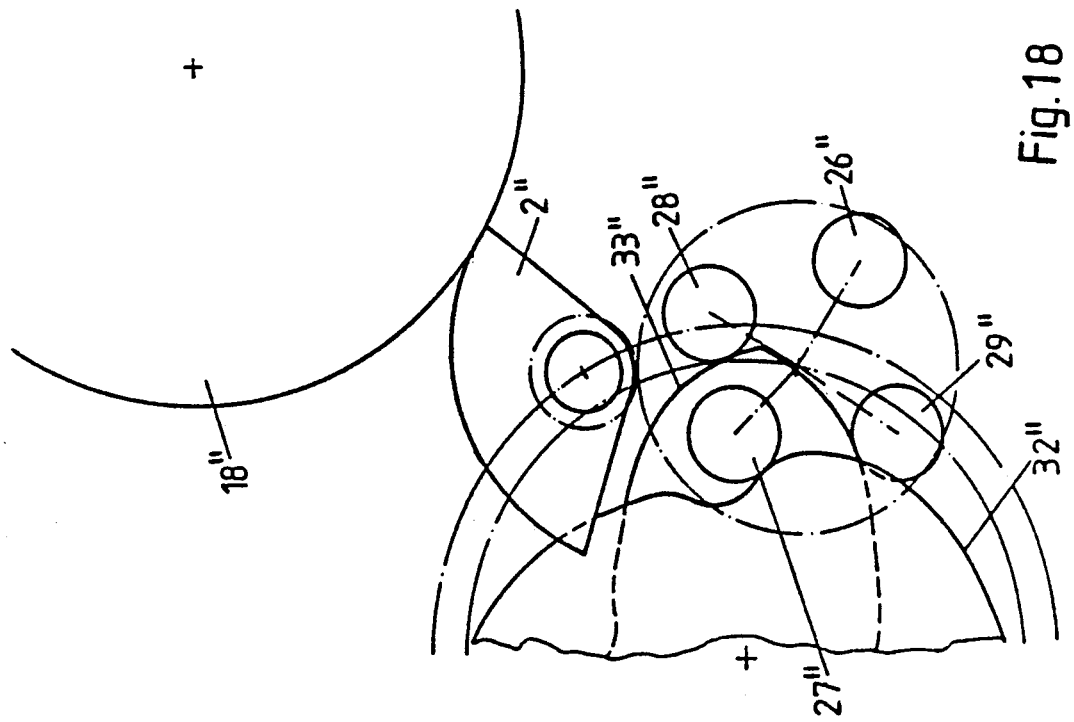
FIGS. 18 and 19 are schematic, fragmentary views of the labelling machine shown in FIG. 1 in two phases of the rolling of an extracting element past the gripper cylinder.
Figure 19:
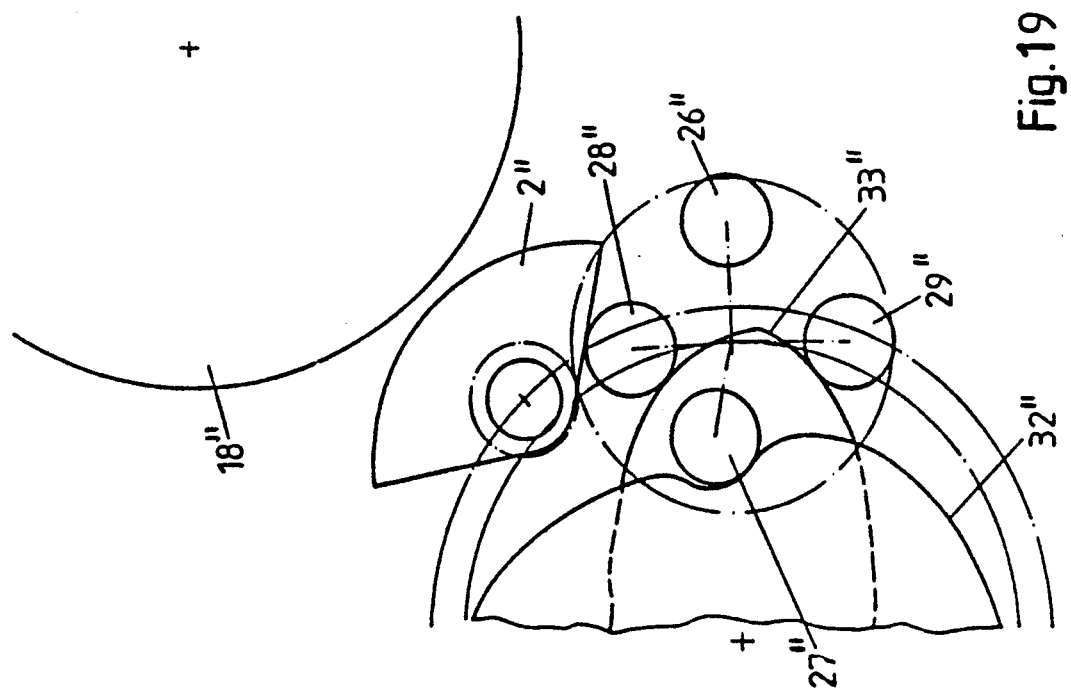

Of all the stations 15", 16", 18", at the station of the gripper cylinder 18", the guidance of the extracting element 2" is at its least critical at the beginning of the rolling sequence. Accordingly, as seen in FIG. 18, the follower 29" with a long lever arm, the one which is the farthest from the bearing shaft 25", transmits torque. However, this guidance, which is not as optimal when compared to the torque-transmitting followers on the other stations, is altogether sufficient. During initial alignment for gripping the label from the extracting element 2" and for some portion of the rotation beyond the initial alignment, as seen in FIG. 19, the two followers 27", 28" with short lever arms act to provide support from the other side for the follower 29".

As generally described above, the preferred labelling machine of FIGS. 11 through 19 for objects, such as bottles or the like, with several stations located behind one another along a track. The stations include an adhesive application roller 15", a label box 16" and a label transfer cylinder 18". The machine includes at least one extracting element 2", 3", 4", 5" for the labels, mounted so that it can rotate on a rotating support 1" and be moved at a different angular velocity past the stations 15", 16", 18" during each rotation of the support 1". The extracting element has an outwardly-curved receptacle surface 2', 3', 4', 5' for the label which rolls along the stations 15", 16", 18". The drive for each extracting element 2", 3", 4", 5" is a cam drive mechanism, which comprises common, stationary double cam discs 31" for all the extracting elements 2", 3", 4", 5" with cams 32", 33" located in two planes with one above the other. Two sets of two followers 26", 27", 28", 29", which are angularly offset from one another and are mounted on each of the drive shafts 6", 7", 8", 9" or on a bearing shaft 25" coupled with each of the drive shafts by means of a support element 24". By means of a form-fit with the two cams 32", 33", the followers produce positive movement of each extracting element 2", 3", 4", 5" over its entire revolution when the support 1" rotates. The labelling machine is characterized by the fact that the axes of all the followers 26", 27", 28", 29" is located inside a moving equivalent cam surface of the cam mechanism while at least one of the followers 26", 29" lies partly outside the moving equivalent cam surface.

The labeling machine portions of all of the followers 26", 27", 28", 29" lying partly outside the moving equivalent cam surface. At least some of the followers 26", 27", 28", 29 " may be offset from one another by an angle which is not equal to 90 degrees and have lever arms of different lengths.

Preferably, either two followers 26", 29" include large lever arms, or two followers 27", 28" include small lever arms with one follower 26", 29" having a large lever arm for engagement with the cams 32", 33".

The labelling machine is preferably characterized by the following engagement alternatives:

(a) With the adhesive application roller 15", two followers 27", 28" with small lever arms are engaged for transmitting torque, and one follower 26" with a large lever arm for supporting from the other side.

(b) With the label box 16", one follower 26" with a large lever arm is engaged for transmitting torque, and one follower 29" with a large lever arm for supporting from the other side.

(c) With the label transmission cylinder 18", one follower 29" with a large lever arm is engaged for transmitting torque, and two followers 27", 28" with small lever arms for supporting from the other side.

The labelling machine may be characterized by the fact that the follower 26" transmitting torque to the label box 16" corresponds to the cam 32" closer to the drive or bearing shaft 25". Additionally, each set of followers 26"-29" comprises one follower 26", 29" with a large lever arm and an opposite follower 27", 28" with a small lever arm.

The labelling machine is further characterized by the fact that the orbit $R_A$ of the drive shaft 6" of the extracting element 2" is less than the orbit $R_L$ of the bearing shaft 25" of the extracting element 2". Still further, when the transmission mechanism 19"-26" lies between the drive shaft 6" and the bearing shaft 25", at least one follower 26" with a large lever arm is tangent to or project beyond the arc of the gear wheel 123", 23a", 23b" located on the bearing shaft 25". Finally, the followers 26", 27" can consist of rollers 26b", 27b" mounted on bearing pins 26a", 27a", whereby the bearing pins 26a", 27a" located closest to the bearing shaft 25" are connected integrally with the support element 24", which supports the gear wheel 123", 23a", 23b" on a radially recessed projection thereof.

Figure 20:
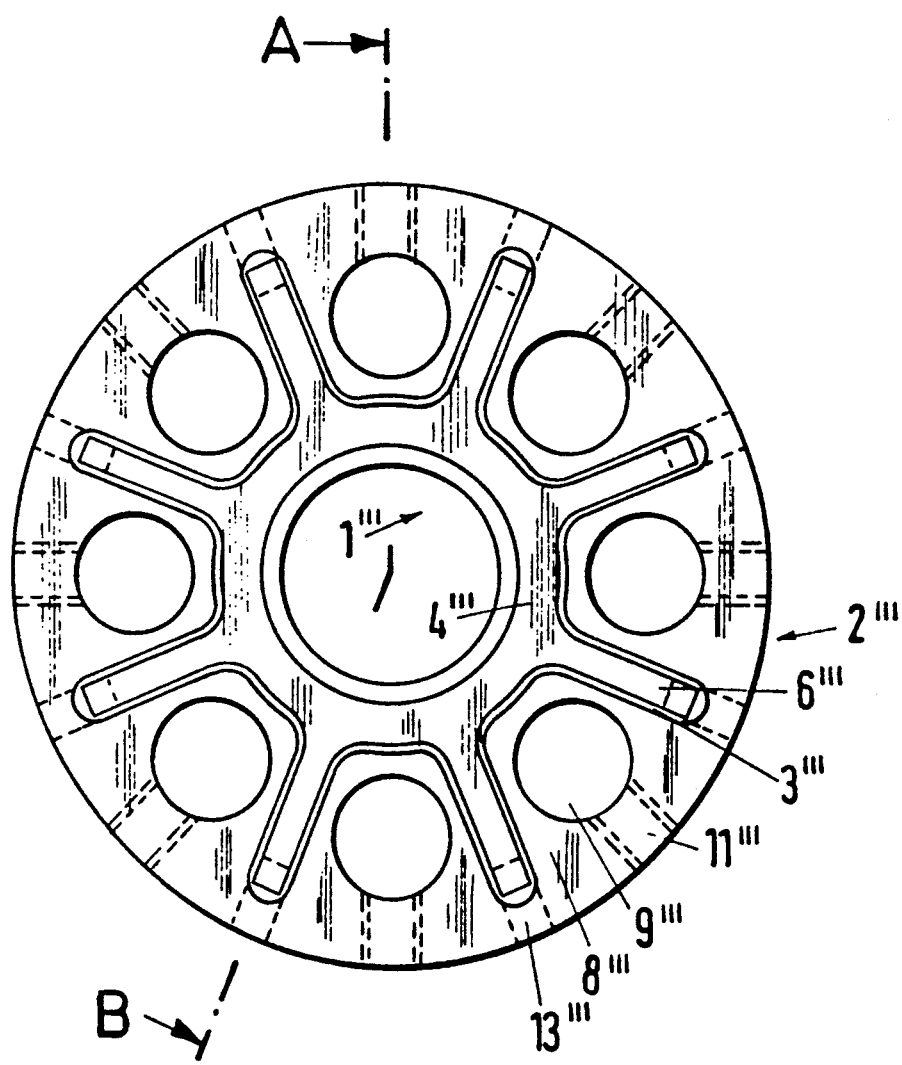
FIG. 20 is an end view of a support element for the followers of a cam drive designed as a lantern gear mechanism.
Figure 21:
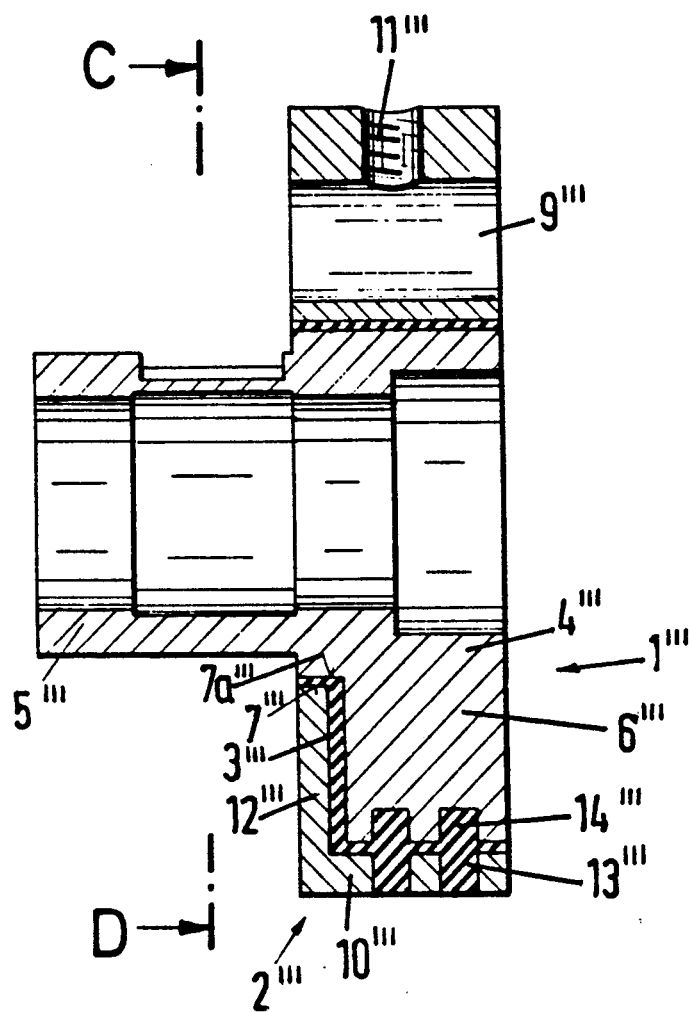
FIG. 21 is a cross-section of the support element of FIG. 20 taken along line A-B.
Figure 22:
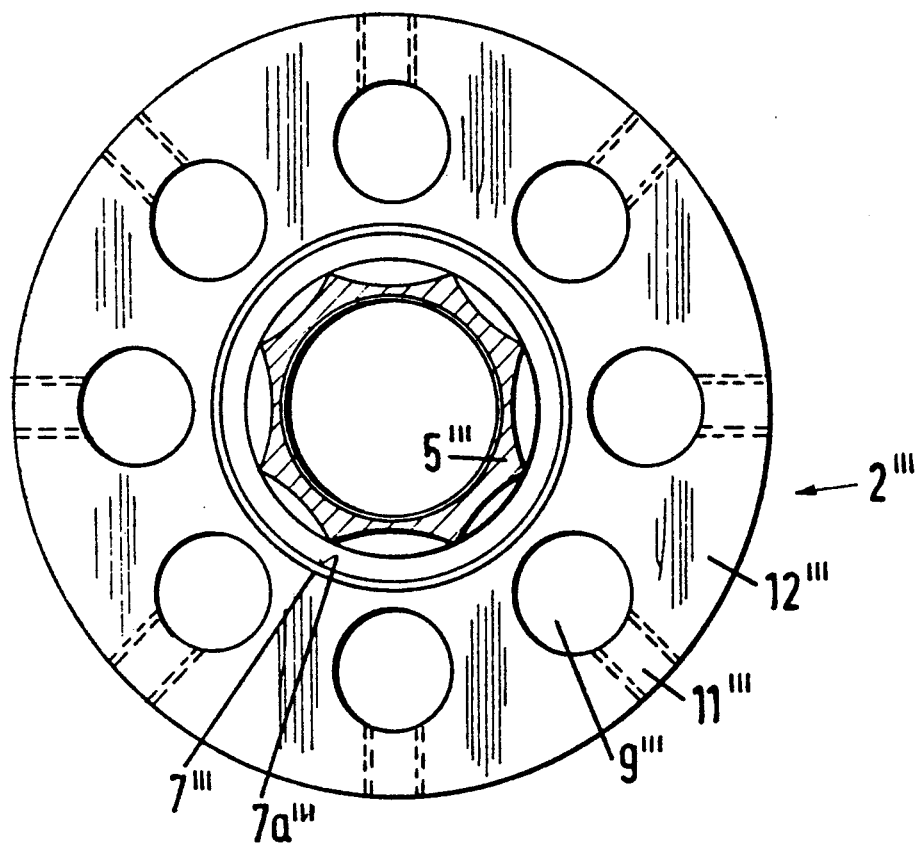
FIG. 22 is a cross-section of the support element of FIG. 20 taken along line C-D.

The support element illustrated in FIGS. 20 through 22 includes an inside body 1''' and an outside body 2''', which are not in direct contact with one another. Insert 3''', made of elastic material, is positioned in the space between bodies 1''' and 2'''.

Inside body 1''' is designed to be fastened on a drive shaft of an extracting element for labels. For this purpose, it has a middle part 4''' and a sleeve 5''' attached to one end. Middle part 4''' supports a number of claws 6''' directed radially outwardly along the circumference. The width of the claws 6''' is significantly less than the distance between claws 6'''.

Outer body 2''' has the basic shape of a basin with central opening 7''', through which middle part 4''' projects by means of sleeve 5'''. Outer body 2''' has radially inwardly-directed claws 8''', which lie between claws 6''' of inner body 1'''. In each of inner claws 8''' there is hole 9''', which is used to hold the bearing pivot of a cam follower. A threaded fastener (not shown) is provided for insertion within radially threaded hole 11'''' in the outer wall 10''' of the basin-shaped outer body 2''' to axially secure the bearing pivot inserted in hole 9'''. End wall 12''', which covers the spaces between claws 8''' is positioned on the end side adjacent to outer body 2'''.

There is a space on all sides between inner and outer bodies 1''' and 2'''. The space is between the engaged claws 6''' and 8''' between end wall 12''' and the end side of claw 6''' facing it and between the inner annular surface of central opening 7''' in outer body 2''' and outer annular surface 7a''' of inner body 1'''. This space is filled by elastic insert 3''', which is relatively thin. The result is contact and support over a large area, which can absorb the forces which occur in all axes without danger of overloading, while maintaining the damping action. For axial protection, radial holes 13''' and blind holes 14''' are positioned in the vicinity of claws 6'''. Holes 13''' and 14''' are axially aligned with one another in pairs and are filled by the elastic material of insert 3'''. The elastic material of insert 3''' is installed jointly with the material for radial holes 13''' and blind holes 14''' by injection.

Figure 23:
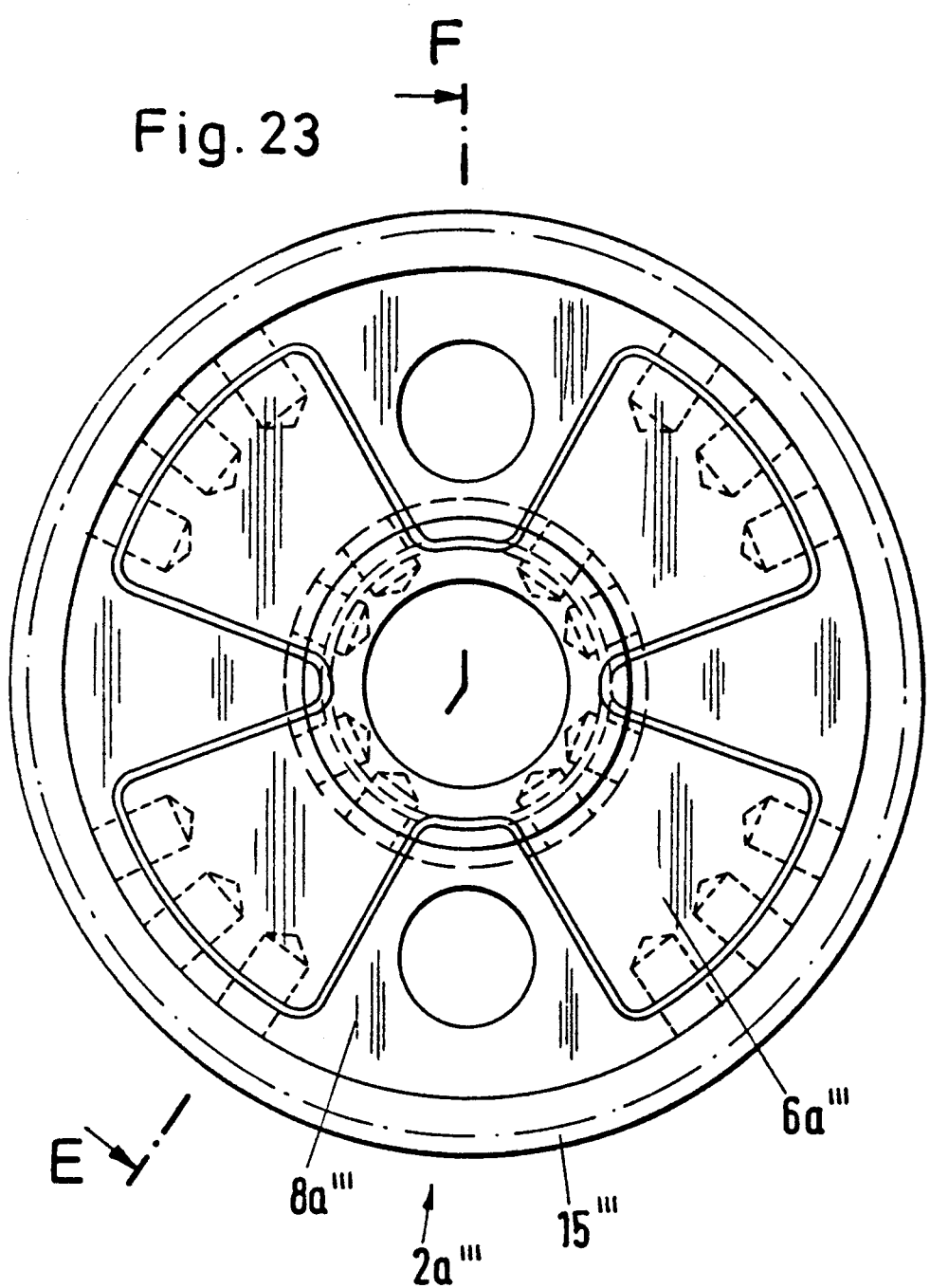
FIG. 23 is an end view of a different support element for followers of a conventional cam drive mechanism.
Figure 24:
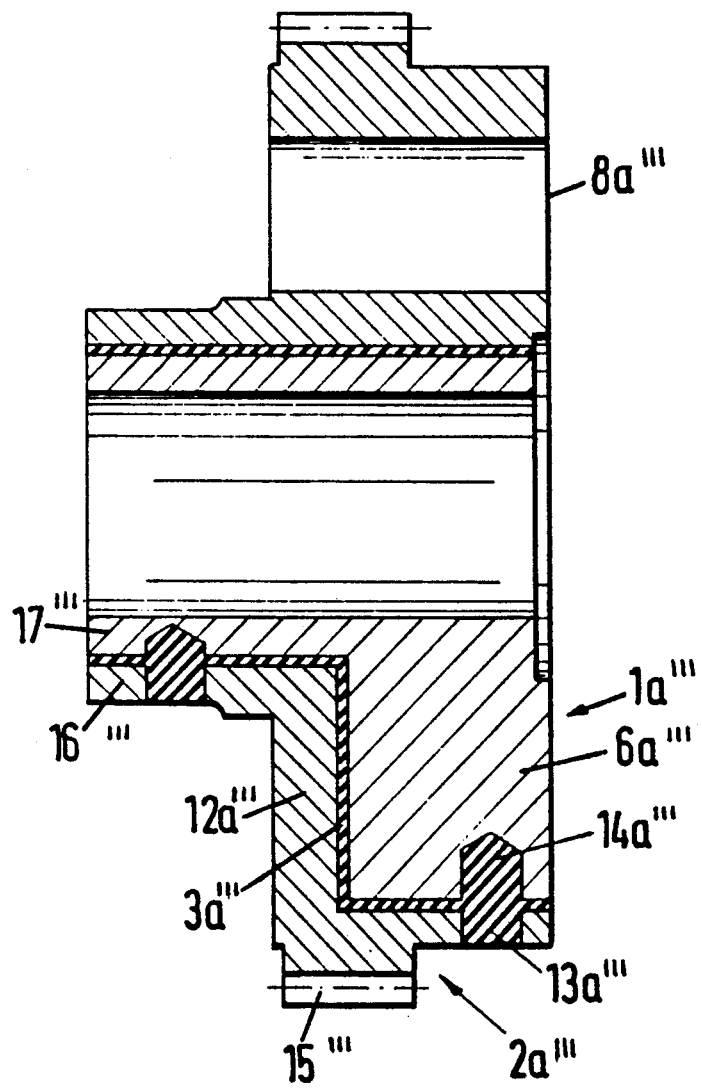
FIG. 24 is a cross-section of the support element of FIG. 23 taken along line E-F.

The support element illustrated in FIGS. 23 and 24 has essentially the same structure as the support element illustrated in FIGS. 20 through 22. Therefore, the following description, primarily, discusses the differences between them.

In the embodiment depicted in FIGS. 23 and 24 only two diametrically opposite claws 8a''' of the outer body 2a''' are provided for the insertion of cam followers. The number of inwardly directed claws 8a''' and outwardly directed claws 6a''' engaged with one another is therefore reduced to four. Moreover, outer body 2a''' has gear teeth on its periphery, so that the support element can also serve as a drive pinion. Finally, the coaxial annular surfaces above one another of outer body 2a''' and of inner body 1a''' are formed by coaxially overlapping sleeve-shaped projections 16''' and 17''' of the outer and inner bodies. Compared to the inner annular surface in the embodiment illustrated in FIGS. 20 and 22, the annular surfaces of the embodiment of FIGS. 23 and 24 are significantly larger, which increases the angular rigidity of both bodies 1a''4 and 2a'''.

FIGS. 25 through 28 show a labelling station which may employ either of the support element described above. The labelling station includes a driven, rotating support 21''', with extracting elements 22''' through 25''' mounted on it so that they can pivot or rotate and stations positioned along the circumference of support 21'''. These stations are adhesive application roller 26''', label box 27''' and gripper cylinder 28'''. Extracting elements 22''' through 25''' are driven by a cam transmission mechanism when support 21''' rotates thereby rolling elements 22''' through 25''' over the surfaces of stations 26''' through 28'''.

Each extracting element is mounted by means of bearing shaft 29''' on support 21'''. Pinion 30''' is on bearing shaft 29''' and is engaged with two-part gear wheel 15''' and 15a'''. The two-part design is intended to offset the two parts, somewhat, from one another resulting in an adjustment of the engagement which is free from play. Support element 2a''', which includes two-part gear wheel 15''' and 15a''', is rotationally connected to drive shaft 31''' which, in turn, is mounted in support 1'''.

Figure 25:
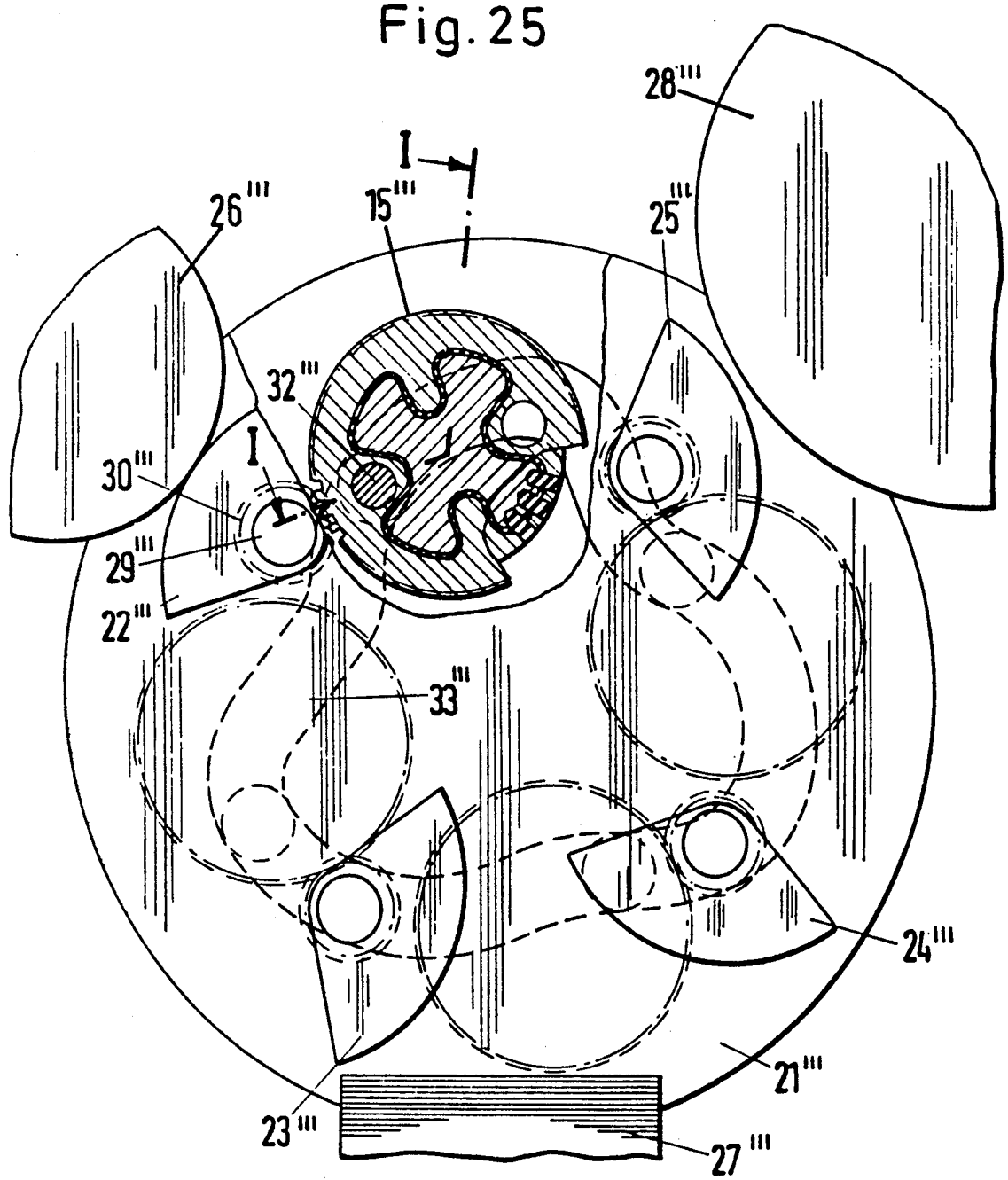
FIG. 25 is a top view of a labelling station with a follower guided in a grooved cam.
Figure 26:
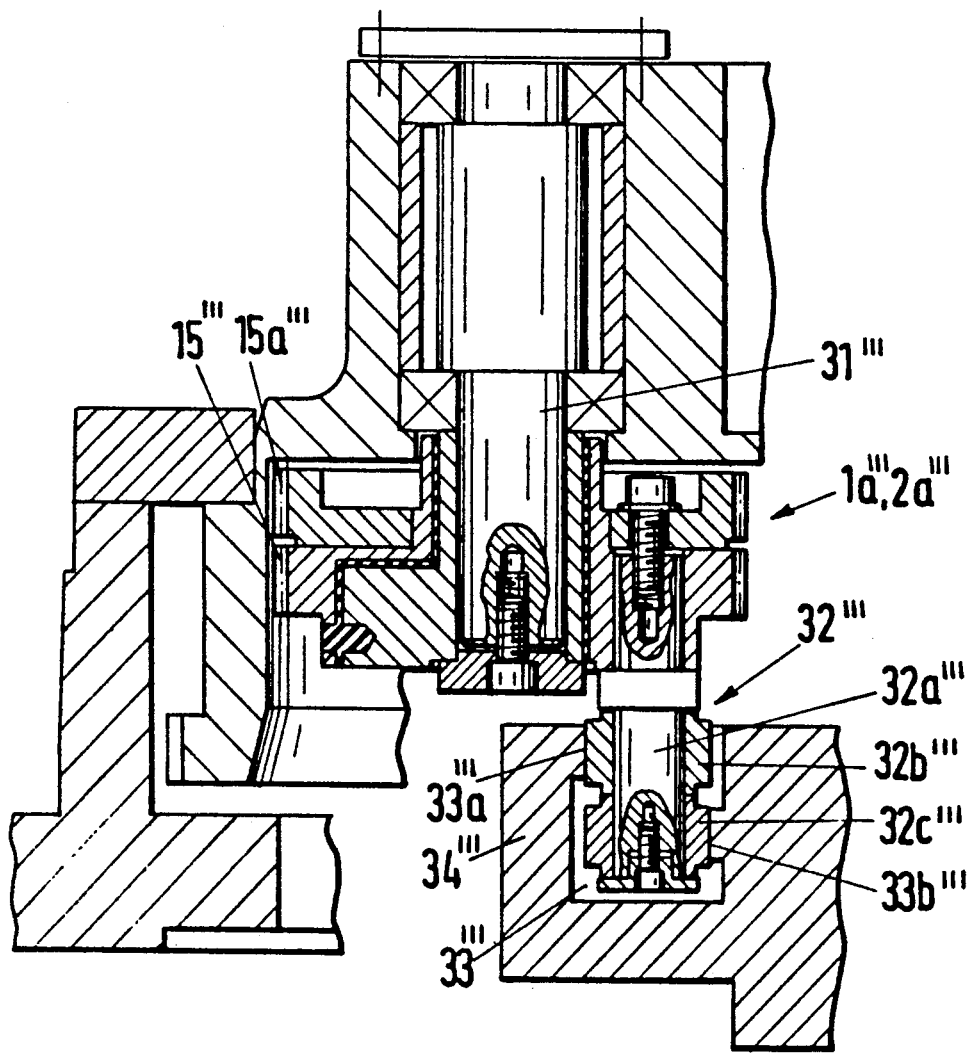
FIG. 26 is a cross-section of the labelling machine of FIG. 25 taken along line I—I.

In the embodiment illustrated in FIGS. 25 and 26, the support element is equipped with single follower 32''', which includes bearing pivot 32a''' which supports rollers 32b''' and 32c'''. Follower 32''' is engaged in grooved cam 33''' of stationary cam support 34'''. Rollers 32b''' and 32c''' are unilaterally guided on opposite flanks 33a''' and 33b'''.

When support 21''' rotates, the support element and thus also extracting element 22''' is pivoted corresponding to the path of grooved cam 33''', so that it rolls over the surfaces of the individual stations 26''' through 28'''. This causes element 22''', sequentially, to receive glue from application roller 26''', apply the adhesive to the top label in label box 27''', remove the top label from box 27''' and transfer the label to gripper cylinder 28'''.

Figure 27:
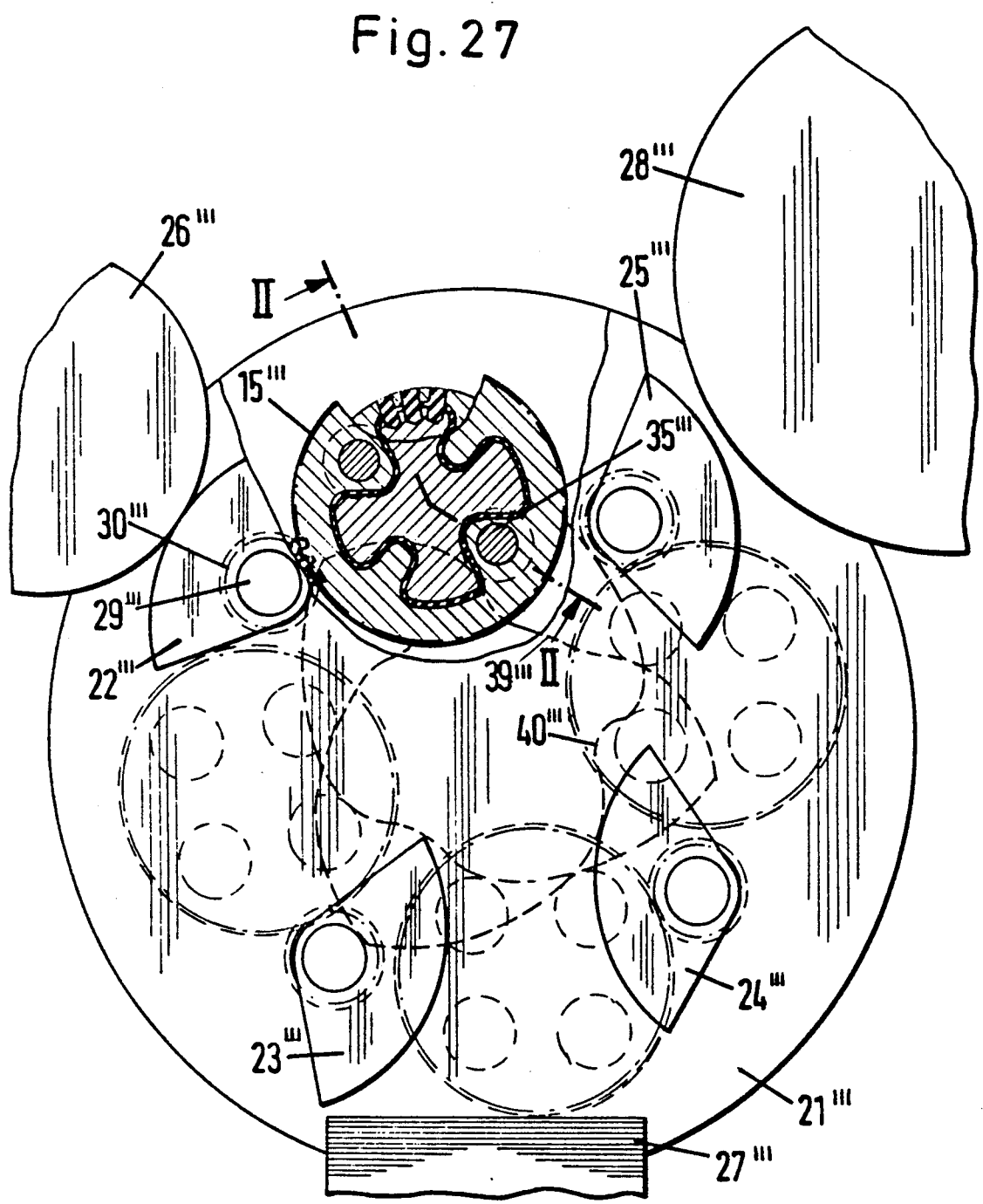
FIG. 27 is a top view of a labelling machine with followers guided on two one-sided outside cams.
Figure 28:
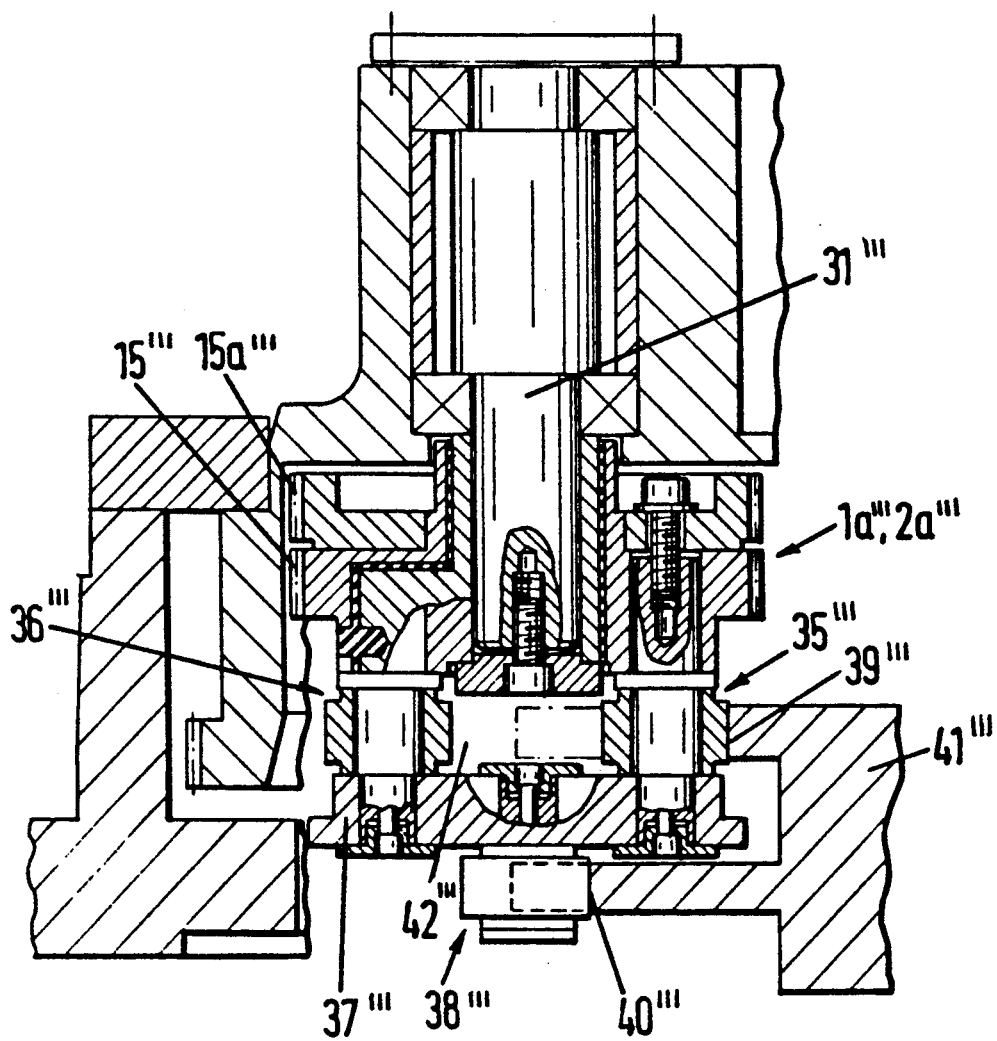
FIG. 28 is a cross-section of the labelling machine of FIG. 27 taken along line II—II.

The embodiment illustrated in FIGS. 27 and 28 differs from the embodiment illustrated in FIGS. 25 and 26 in that the support element is equipped with two followers 35''' and 36''', which support bridge element 37'''. Bridge element 37''' is also equipped with two followers 38''', which are offset by approximately 90 degrees from followers 35''' and 36'''. FIG. 28 shows only one of the two followers. Corresponding to the two pairs of followers are two overlapping and separate one-sided outer cams 39''' and 40''' of common stationary cam support 41'''. In the space between the two outer cams, 39''' and 40''', is bridge element 37'''. Outer cams 39''' and 40''' have the basic shape of indented ovals and are oriented crossways to one another. When support 21''' rotates, the support element and the extracting element are rotated in the same direction causing the extracting element to roll over the surface of stations 26''' through 28'''. Bridge element 37''' allows outer cams 39''' and 40''' to be completely filled thereby allowing the support element and the extracting element 22''' to be clearly guided. Bridge element 37''', thus, allows upper outer cam 39''' to extend into vicinity 42''' of the axis of the drive shaft 31'''.

Although for purposes of illustration the cam followers shown have been attached through a mounting to a support which is then attached to a drive shaft, it is to be understood that the followers may also be directly connected to the drive shaft In this embodiment the elastic dampening material would be interposed directly between the mounting for the followers and the drive shaft.

In summary, what is provided is a support element mounted on a shaft 31''' for the followers 32''', 35''', 36''', 38''' of a cam drive mechanism, in particular a mechanism for a label extracting element 22''' to 25''' and a labelling station, characterized by the fact that the support element comprises an outer body 2''', 2a''' and an inner body 1''', 1a''' located inside it at some distance from it on all sides, whereby the outer body 2''', 2a''' has claws 8''', 8a''' directed radially inward, and the inner body 1''', 1a''' has claws 6''', 6a''' directed radially outward between the inwardly directed claws and the space between the two bodies 1''', 1a''', 2''', 2a''' is filled with an insert 3''', 3a''' of elastic material, and that the inwardly directed claws 8''', 8a''' of the outer body 2''', 2a''' are designed for the insertion of followers 32''', 35''', 36''', 38'''. The support element is characterized by the fact that the spaces between the claws 8''', 8a''' of the outer body 2''', 2a''' are enclosed by an end wall 12''', 12a''' and that between this end wall 12''', 12a''' and the end surfaces of the claws 6''', 6a''' of the inner body 1''', 1a''' facing it, elastic insert 3''', 3a''' is located.

Also, the support element is characterized by the fact that between the two bodies 1''', 1a''', 2''', 2a''' there are annular surfaces which extend axially, between which the elastic insert 3''', 3a''' is located. Further, the support element is characterized by the fact that the annular surfaces are formed by sleeve-shaped projections 16''', 17''' of the inner and outer bodies 1''', 1a''', 2''', 2a''' located coaxially above one another. Additionally, the support element is characterized by the fact that the annular surfaces make the transition gradually into the radially inward surfaces of the inwardly-directed claws 8a''' of the outer body, in the spaces containing the outwardly-directed claws 6a''' of the inner body 1a''' and containing the claws 8a''' of the outer body 2a'''.

The support element is further characterized by the fact that there are several radial recesses 13''', 13a''', 14''', 14a''' in the inside and outside body 1''', 1a''', 2''', 2a''', which are filled with a slug of elastic material connected with elastic insert 3''', 3a'''. Also, the support element is characterized by the fact that the recesses 13''', 13a''', 14''', 14a''' with the slug are on the outside circumference of the support element. Further, the support element is characterized by the fact that the recesses 13''', 13a''', 14''', 14a''' are aligned with one another in pairs. Additionally, the support element is characterized by the fact that the outer body 2''' has a drive pinion 15'''.

Also provided is a labelling station for objects, in particular, bottles with several stations located behind one another along a track, namely an adhesive application apparatus 26''', a label transfer station 28''', and with at least one extracting element 22''' to 25''' for the labels, mounted so that it can rotate on a rotating support 21''' and be moved passed the stations 26''', 27''', 28''' during each rotation of the support 21''', which extracting element has an outwardly-curved receptacle surface for the label which rolls along the currently foremost label in the label feed station 27''' and the other stations whereby the drive for each extracting element 22''' to 25''' is a cam drive, which comprises common, stationary double cams 33''', 33a''', 33b''', 34''', 39''', 40''', 41''' for all the extracting elements 22''' to 25''' and one or more interacting followers 32''', 35''', 36''', 38''' which are mounted on the drive shaft 31''' or on a bearing shaft 60''' coupled with it by means of a support element 1''', 2''', 1a''', 2a''' and which by means of the form-fit with the double cam 33''', 33a''', 33b''', 34''', 39''', 40''', 41''' protect the rotational movement of each extracting element 26''' to 28''' when the support 21''' rotates, characterized by the fact that the driver bearing shaft 31''' ends in front of the plane of the followers 32''', 35''', 36''', 38''' and the support element 1''', 2''', 1a''', 2a''' is designed for the optional insertion of a single follower 32''', which is engaged with a double cam 33''', 33a''', 33b''', 34''' designed as a grooved cam, or for the insertion of two followers 35''', 36''' diametrically opposite one another in relation to the axis of the drive shaft 31''' where the bearing shaft, which interact with a first one-sided cam 39''' of the double cam 39''', 40''', 41''' and support a bridge element 37''' which is located between the first cam 39''' and a second cam 40''' located at some distance from it and which supports followers 38''' off-set from the followers 35''', 36''' of the first cam 39''' by approximately 90 degrees in interacting with the second cam 40'''.

The labelling machine illustrated in FIG. 29 through 32 includes rotating transport table 1'''', which moves containers 2'''' so that they may be labelled. The containers are moved on a track, in the form of a circular arc, past gripper cylinder 3'''', which transfers a label with adhesive to container 2''''. Gripper cylinder 3'''' takes the glued label from curved receptacle surfaces 4'''' of extracting elements 5''''. Elements can rotate eccentrically to curved receptacle surface 4'''' on support table 6'''', or may be mounted so that they can rotate or pivot eccentrically to the support axis.

Each extracting element 5'''' is driven when support table 6'''' is in rotation by means of a transmission, which includes cam disc 7'''', which is common for all extracting elements 5'''' and which has two outside cams, 7a'''' and 7b'''', at different heights and drive wheel 8'''' on which are mounted cam followers 8a'''', 8b'''', 8c'''' and 8d''''. The driving of extracting elements 5'''', as indicated in FIG. 20, can be accomplished directly by means of transmission 120'''' and 121''''. The rotational or pivoting movement of extracting elements 5'''' is not uniform, so that their receptacle surfaces can roll over adhesive application roller 9'''', stationary label box 10'''' and gripper cylinder 3'''', in the same direction.

Figure 29:
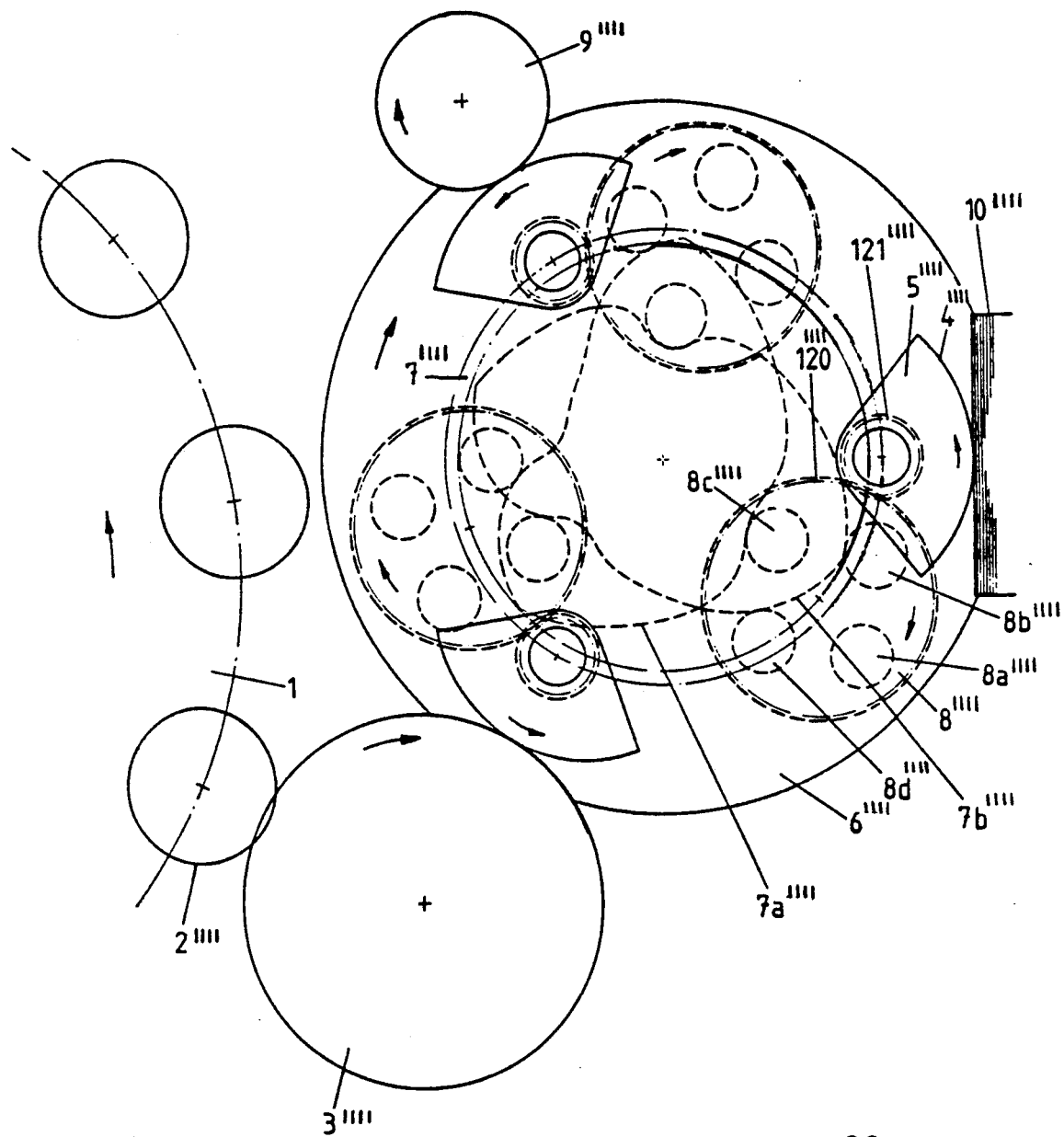
FIG. 29 is a schematic plan view of a labelling machine.
Figure 32:
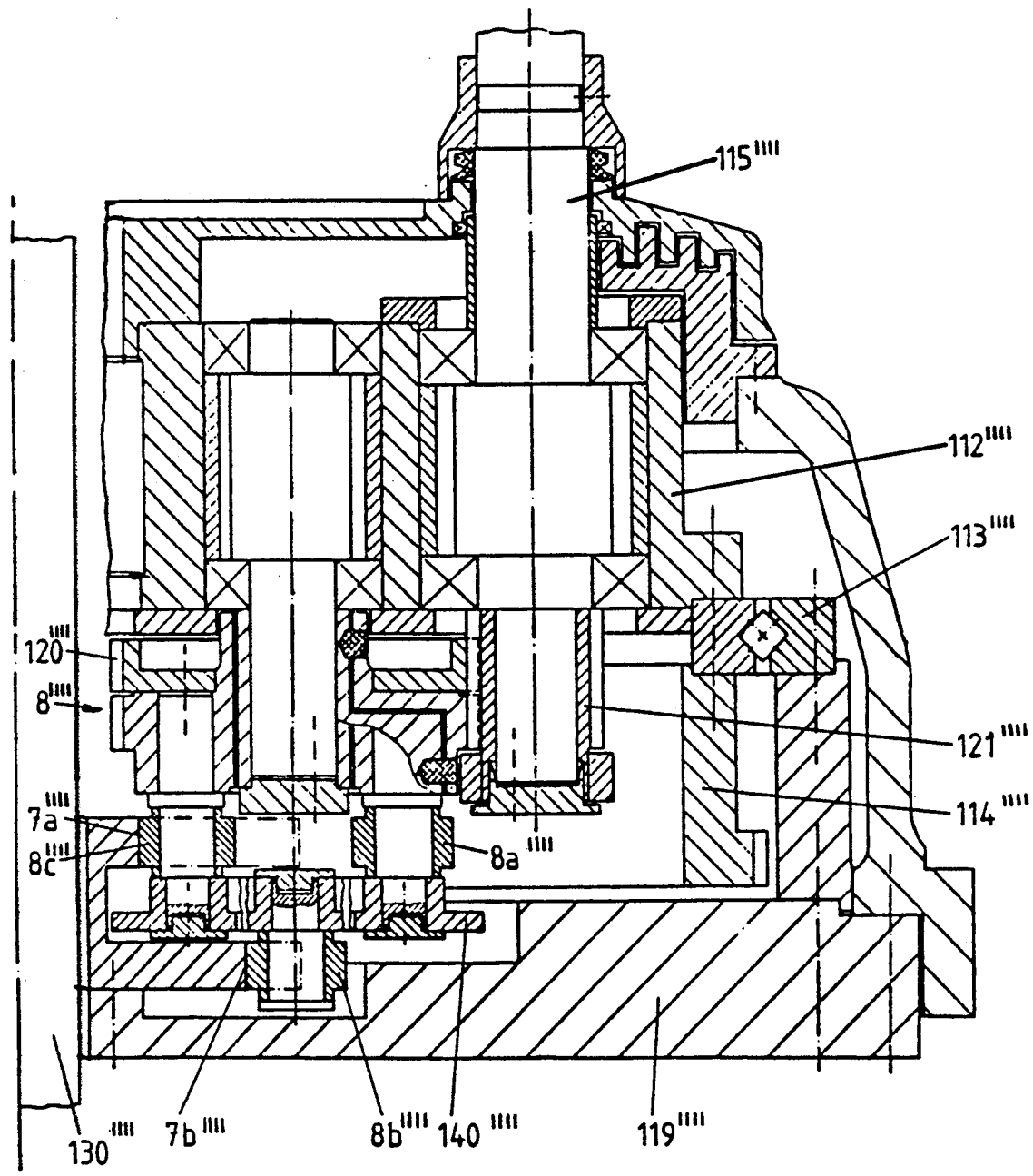
FIG. 32 is a cross sectional view of a support of the labelling machine illustrated in FIG. 29.

With the embodiment of the invention illustrated in FIGS. 29 and 32, the drive of each extracting element 5'''' is by means of a cam transmission consisting of two outside cams, 7a'''' and 7b'''' which are positioned at different heights and followers 8a'''', 8b'''', 8c'''' and 8d'''' which ride on cams 7a'''' and 7b''''. The transmission mechanism in the embodiment illustrated in FIG. 30 consists of cam disc 19'''' with grooved cam slot 19a'''' and followers 18'''' in the form of rollers mounted on a lever arm 17''''.

Figure 30:
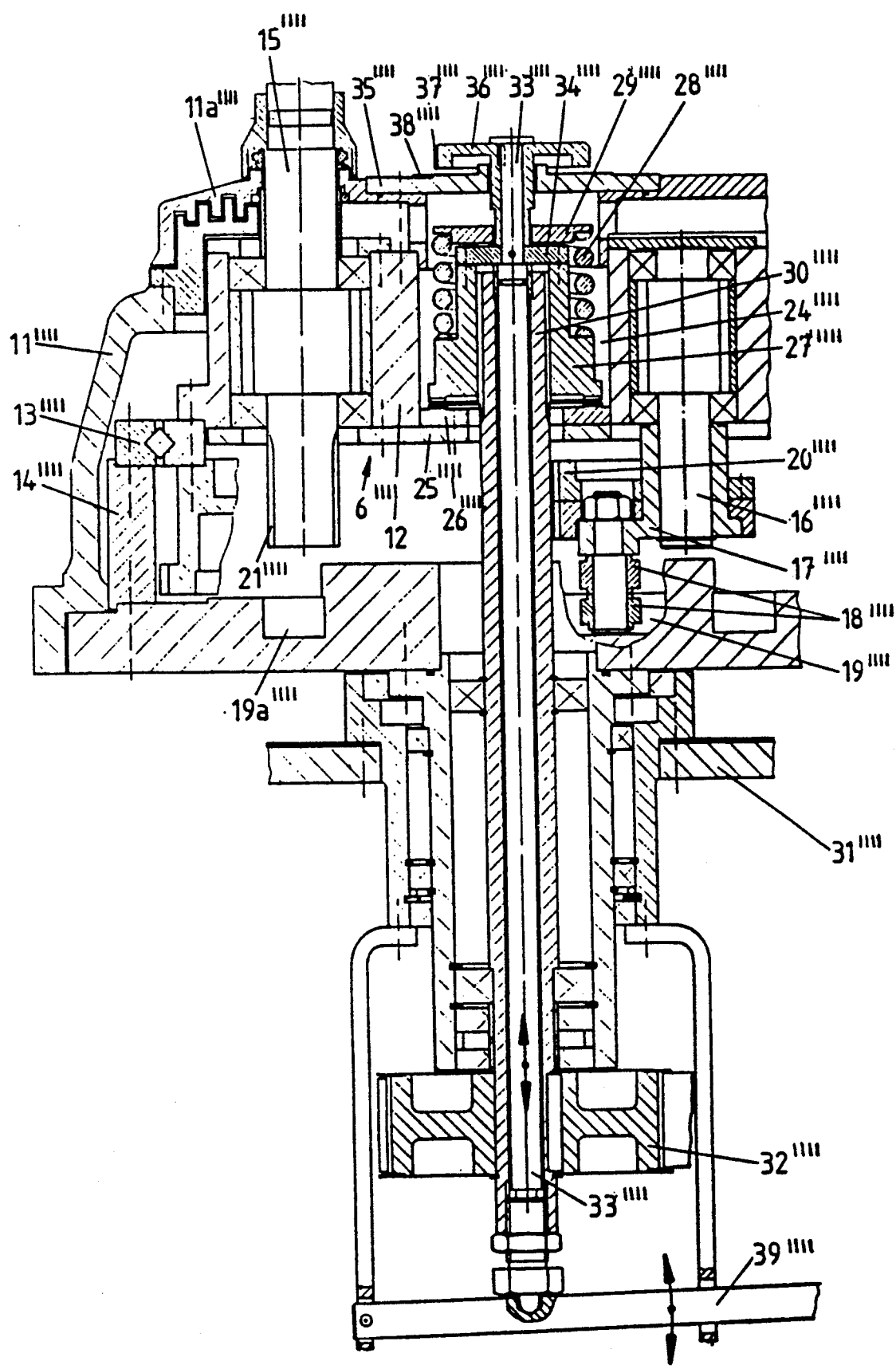
FIG. 30 is a cross-sectional view of a support of the labelling machine of FIG. 29 which employs different drives for the extracting elements than that of FIG. 29.
Figure 31:
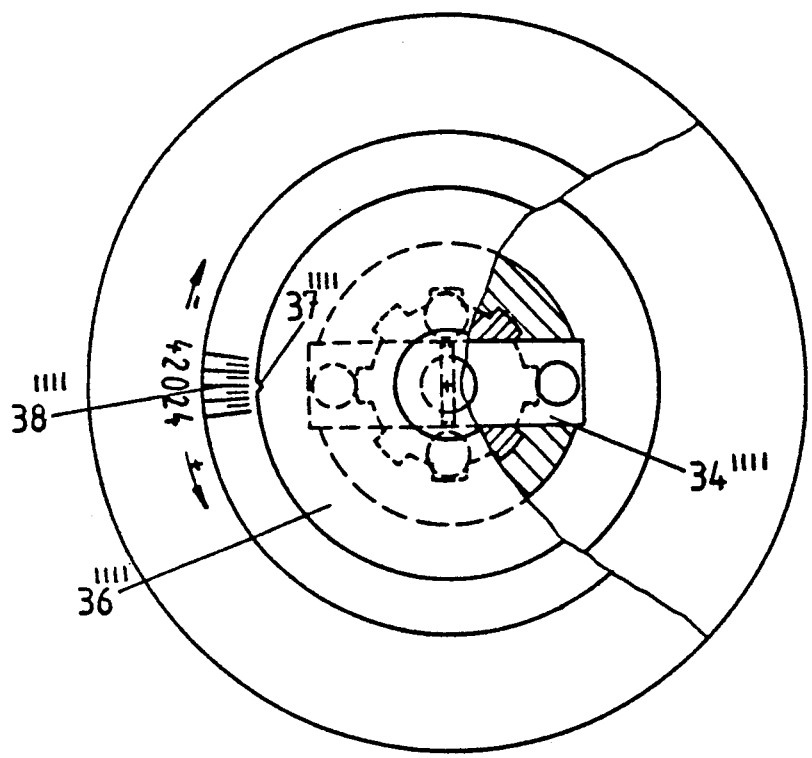
FIG. 31 is a top view of the central portion of the support illustrated in FIG. 30.

Support table 6'''', as shown in FIG. 30, has upper cover plate 11a'''', housing 11'''' and, underneath it and connected to it, bearing structure 12'''' which is mounted on the outside circumference of the table 6'''' by means of angular roller bearing 13''''. Bearing structure 12'''' is also used to mount drive shafts 15'''', which extend upward through cover plate 11a'''' and support extracting elements 5'''', and to mount bearing shafts 16'''' which support followers 18'''' through lever arms 17''''. Followers 18'''' engage closed grooved cam 19a'''', which is common to all followers 18'''', of the cam disc 19''''. Closed groove cam 19a'''' is similar in construction to grooved cam 33'''' in FIG. 25. Pinions 20'''' mesh with gear wheel 21'''' on drive shafts 15'''' of the extracting elements 5'''' and are mounted so that they do not rotate on the bearing shafts 15''''. Gear wheel 21'''' meshes with a gear wheel of the synchronously driven adhesive application roller 23''''.

In central space 24'''', left open by the drive and transmissions of the extracting elements, between cover plate 11a'''' and mounting plate 25'''', there is an axially retractable spur gear coupled with one coupling half, 26'''', which is fastened to mounting plate 25'''' and the other coupling half, 27''''. Coupling half 27'''' is biased by coil spring 28'''' so that it is normally held in direct contact with coupling half 26'''' when hand lever 39'''' is lowered. For this purpose, coupling half 27'''' is in contact with annular disc 29'''', which is supported by central drive shaft 30'''' which is a hollow shaft. Hollow drive shaft 30'''' extends downward through a central opening in base plate 31'''' of machine frame 14'''', where it is mounted and supports belt wheel 32'''' which is normally connected to a drive belt which extends from a drive (not shown).

Bumper 33'''' runs through hollow drive shaft 30'''' and has stationary crosshead 34'''' on its upper end, which extends with both legs through axial slits in drive shaft 30'''' and is connected with coupling half 27''''. Bumper 33'''' runs through a central opening of marking disc 35'''' which, in turn, is inserted in an opening of cover plate 11a''''. On its free end, bumper 33'''' supports marking wheel 36'''' with notch 37'''' which corresponds to marks 38'''' on marking disc 35''''. The spacing of marks 38'''' coincides with the spur gear teeth of coupling halves 26'''' and 27''''.

To disengage the two coupling halves 26'''' and 27'''', so that support table 6'''' can be twisted relative to drive shaft 30'''' and with the marking ring 36'''', bumper 33'''' is lifted by means of hand lever 39'''', the lower end of which supports bumper 33''''.

FIG. 30 illustrates the retracted state of coupling halves 26'''' and 27''''. After uncoupling, the labelling station, as shown in FIG. 29, can be rotated independently of the machine drive and can be set up in the desired position for the label to be transferred. The degree of misalignment can be read from markings 37'''' and 38''''.

The embodiment illustrated in FIG. 32 differs, as noted above, from the embodiment illustrated in FIG. 30 principally in terms of the transmission. FIG. 32, moreover, does not show the coupling. The embodiment in FIG. 32 is primarily intended to show the compact construction, because in this embodiment the transmission with the cams extends almost up to drive shaft 130. For the sake of simplicity, in this embodiment, the same identification numbers are used as in FIG. 30, but are preceded by the number 1.

In the embodiment illustrated in FIG. 32, cam disc 119'''' is designed as a bridge element and supports two outside cams, 7a'''' and 7b '''', in two different planes. Followers 8a'''', 8c'''', 8b'''' and 8d'''' interact with outside cams 7a'''' and 7b'''' and are mounted on drive wheel 8'''', which is engaged by drive pinion 120'''' with pinion 121'''' positioned on the drive shaft of extracting element 115''''. Bridge element 140'''', which is supported by the bearing pivot of the followers 8a'''' and 8c'''', is provided to support the bearing pivots of the lower followers 8b'''' and 8d ''''.

In summary, the invention provides a labelling station of a labelling machine for containers, in particular bottles 2'''', which have a support 6'''', a support table 11''''. The support 6'''' can be driven via a coupling 26'''', 27'''', by a central drive shaft 30'''', supports at least one extracting element 5'''' and is mounted so that it can rotate in the machine frame 14''''. When the support 6'''' rotates, the extracting element 5'''' which has in particular a curved receptacle surface 4'''' and is mounted on it eccentrically so that it cam rotate or pivot around its own axis and is moved along a closed track past stations 3'''', 9'''', 10'''' for the application of adhesive to the receptacle surface and for the storage and transfer of labels. For each extracting element 5'''', for whose rotating or pivoting motion there is a transmission 16''''–21'''', in particular a cam transmission, with a common transmission part, in particular a cam disc 19'''' mounted on the machine frame 14'''' for all the extracting elements 5''''. The mounting 13'''' of the support 6'''' in the machine frame 14'''' is located exclusively on the outside edge of the support 6''''.

Another aspect of the invention resides in that the coupling 26'''',27'''' between the drive shaft 30'''' and the support 6'''' is located inside a central space inside the orbit described by the transmission 16''''–21'''', between the cover plate 11a'''' of the support 6'''' and the parts 16''''–21'''' of the transmission engaged with one another.

Still another aspect of the invention resides in that a non-rotating bumper 33'''' extends through the drive shaft 20'''' designed as a hollow shaft and which can move axially inside it and to each is attached a spring-loaded coupling half 27'''' of the axially retractable coupling 26'''', 27'''', the end of which projects from the table 11'''' of the support 6'''', together with the adjacent portion 35'''' of the table 11'''', has alignment marks 37'''', 38''''.

A further aspect of the invention resides in that the coupling halves 25'''', 27'''' are engaged with one another by means of spur gear teeth 26a'''', 27a'''', the spacing of which corresponds to the spacing of the alignment marks 38''''.

The invention as described hereinabove in the context of the preferred embodiments is not to be taken as limited to all of the provided details thereof, since modifications and variations thereof may be made without departing from the spirit and scope of the invention.

What is claimed is:

1. Labelling machine for supplying labels to bottles or the like; said labelling machine including a plurality of stations located one behind another along a track; the plurality of stations including an adhesive application station, a label feed station, and a label transfer station; said labelling machine comprising:

a rotating support mounted on a central axis for rotation by each of the plurality of stations;

at least one extracting means for the labels;

said extracting means including a drive shaft means and being mounted ar said drive shaft means for rotation on said rotating support for movement by each of the stations during each rotation of said rotating support;

means for rotating said extracting means including cam means and follower means;

said cam means including a first cam disc and a second cam disc;

said first cam disc and said second cam disc being disposed below said rotating support at said central axis;

said first cam disc being an outside cam and including a first outer cam surface extending about said central axis;

said second cam disc being an outside cam and including a second outer cam surface extending about said central axis;

said first cam disc being disposed axially above said second cam disc;

means for operably connecting said follower means to said drive shaft means;

said follower means being mounted for rotation about a follower axis on said rotating support to cause said rotation of said extracting means;

said follower means including a follower support element disposed in a plane axially above said first cam disc;

said follower means including a first pair of followers aligned with said first cam disc for making contact with said first outer cam surface and a second pair of followers aligned with said second cam disc for making contact with said second outer cam surface;

each of said first pair of followers and said second pair of followers having said followers thereof being mounted on said followers support element at substantially opposite sides of said follower axis;

said follower means rotating about said cam means for producing said rotation of said extracting means;

said first pair of followers and said second pair of followers defining a moving equivalent cam surface;

said first cam disc and said second cam disc defining a fixed equivalent cam surface;

said moving equivalent cam surface being for rotation about said fixed equivalent cam surface with point by point rolling contact therebetween when said follower means is rotated about said cam means;

each of said followers including a center of rotation which is radially located within said moving equivalent cam surface; and at least a portion of at least one of said followers lying outside of said moving equivalent cam surface.

2. Labelling machine according to claim 1, wherein each of said followers includes a portion thereof which lies outside of said moving equivalent cam surface.

3. Labelling machine according to claim 1, wherein at least some of said followers are offset from one another by an angle not equal to 90 degrees and have lever arms from said follower axis of different lengths.

4. Labelling machine according to claim 3, wherein two of said followers including longer ones of said lever arms are in engaging contact with said cam means during at least part of said rotation about said central axis.

5. Labelling machine according to claim 3, wherein two of said followers including shorter ones of said lever arms and one of said follower with a longer one of said lever arms are in engaging contact with said cam means during at least part of said rotation about said central axis.

6. Labelling machine according to claim 3, wherein at the adhesive application station, two of said followers with shorter said lever arms are engaged with said cam means for transmitting torque and one of said followers with a shorter said lever arm is for supporting from the other side of said cam means.

7. Labelling machine according to claim 3, wherein at the label feed station, one of said followers with a longer said lever arm is engaged with said cam means for transmitting torque and one of said followers with a longer said lever arm are for supporting from the other side of said cam means.

8. Labelling machine according to claim 3, wherein at the label transfer station, one of said followers with a longer said lever arm is engaged with said cam means for transmitting torque and two of said followers with shorter said lever arms are for supporting from the other side of said cam means.

9. Labelling machine according to claim 7, wherein the follower for transmitting torque at the label feed station corresponds to said first cam disc.

10. Labelling machine according to claim 3, wherein one of said followers of said first pair and one of said followers of said second pair include long said lever arms and an opposite ones of said followers of said first pair and of said second pair include short said lever arms.

11. Labelling machine according to claim 1, wherein an orbit of said drive shaft means about said central axis is longer than an orbit of said follower axis about said central axis.

* * * * *